United States Patent [19]
Seto et al.

[11] Patent Number: 5,623,457
[45] Date of Patent: Apr. 22, 1997

[54] PHOTOMAGNETIC DISC DRIVE SYSTEM HAVING A LOCKING MECHANISM

[75] Inventors: Hidekazu Seto; Sunao Aoki, both of Kanagawa, Japan

[73] Assignee: Sony Corporation, Tokyo, Japan

[21] Appl. No.: 541,233

[22] Filed: Oct. 12, 1995

Related U.S. Application Data

[63] Continuation of Ser. No. 228,682, Apr. 12, 1994, abandoned.

[30] Foreign Application Priority Data

Apr. 12, 1993 [JP] Japan .................. 5-084460
Mar. 17, 1994 [JP] Japan .................. 6-046747

[51] Int. Cl.⁶ .................................................. G11B 11/00
[52] U.S. Cl. .......................................... 369/13; 369/75.2
[58] Field of Search ............................. 369/13, 14, 75.2, 369/75.1, 77.2, 77.1, 78, 79, 215

[56] References Cited

U.S. PATENT DOCUMENTS

| | | | |
|---|---|---|---|
| 4,571,646 | 2/1986 | Bauck et al. ................. | 360/99 |
| 4,694,442 | 9/1987 | Gizen et al. ................. | 369/44 |
| 4,723,185 | 2/1988 | Maeda ......................... | 360/97 |
| 4,730,299 | 3/1988 | Kamoshita et al. .......... | 369/264 |
| 4,899,238 | 2/1990 | Inoue et al. ................. | 360/99.06 |
| 4,914,647 | 4/1990 | Ono et al. ................... | 369/77.2 |
| 4,941,140 | 7/1990 | Ono et al. ................... | 369/264 |
| 4,945,433 | 7/1990 | Suzuki et al. ............... | 360/99 |
| 4,991,044 | 2/1991 | Yanamoto et al. ........... | 360/99.07 |
| 5,043,969 | 8/1991 | Carey et al. ................. | 369/77.2 |
| 5,056,078 | 10/1991 | Carey et al. ................. | 369/77.2 |
| 5,103,435 | 4/1992 | Nemoto et al. .............. | 369/13 |
| 5,122,998 | 6/1992 | Mizuno et al. ............... | 369/13 |
| 5,123,004 | 6/1992 | Arai ............................. | 369/75.2 |
| 5,163,038 | 11/1992 | Arai ............................. | 369/77.2 |
| 5,187,701 | 2/1993 | Verheyen ..................... | 369/75.2 |
| 5,224,079 | 6/1993 | Inoue ........................... | 369/13 |
| 5,268,882 | 12/1993 | Mukawa ....................... | 369/13 |
| 5,331,611 | 7/1994 | Matsuba ....................... | 369/13 |

FOREIGN PATENT DOCUMENTS

| | | |
|---|---|---|
| 349279A2 | 1/1990 | European Pat. Off. . |
| 0415543A3 | 7/1990 | European Pat. Off. . |
| 0427330A3 | 11/1990 | European Pat. Off. . |
| 0439286A3 | 1/1991 | European Pat. Off. . |
| 473413 | 3/1992 | European Pat. Off. ........... 369/13 |
| 0473413A3 | 4/1992 | European Pat. Off. . |
| 0509531A2 | 10/1992 | European Pat. Off. . |
| 0532247A2 | 3/1993 | European Pat. Off. . |
| 564148 | 10/1993 | European Pat. Off. ........... 369/13 |
| 0571227A2 | 11/1993 | European Pat. Off. . |
| 0579172A2 | 1/1994 | European Pat. Off. . |
| 3337689A1 | 4/1984 | Germany . |
| 3606600A1 | 9/1986 | Germany . |
| 57-30140 | 2/1982 | Japan . |
| 57-154669 | 9/1982 | Japan . |

(List continued on next page.)

*Primary Examiner*—Tan Dinh
*Attorney, Agent, or Firm*—Limbach & Limbach L.L.P.

[57] ABSTRACT

An apparatus for recording and reproducing information stored on a photomagnetic disc, includes a magnetic head which produces magnetic field. The apparatus comprises a carriage radially movable with respect to the photomagnetic disc. A head supporting mechanism is shiftably disposed on the carriage between a loading position where the magnetic head is contacted with the end face of the photomagnetic disc to apply the magnetic field thereto and an unloading position where the magnetic head is disposed remote from the end face of the photomagnetic disc to be prevented from applying the magnetic field thereto. A locking mechanism is shiftable between a locking position where the locking mechanism engages the head supporting mechanism and a release position where the locking means disengages the head supporting mechanism. A driving mechanism is so constructed as to be energized during shifting movement of the locking mechanism between the locking position and the release position. A retaining mechanism for retaining the head supporting mechanism at the loading and unloading positions, respectively, is disposed on the carriage and the head supporting mechanism.

18 Claims, 31 Drawing Sheets

FOREIGN PATENT DOCUMENTS

| | | |
|---|---|---|
| 63-173306 | 7/1988 | Japan . |
| 1-22057 | 9/1989 | Japan . |
| 3-19160 | 1/1991 | Japan ................................... 369/13 |
| 3-104069 | 5/1991 | Japan ................................... 369/13 |
| 3-80562 | 8/1991 | Japan . |
| 4-79065 | 3/1992 | Japan . |
| 4-186555 | 7/1992 | Japan . |
| 5-62279 | 3/1993 | Japan ................................... 369/13 |
| 5-128616 | 5/1993 | Japan ................................... 369/13 |
| 5-274740 | 10/1993 | Japan ................................... 369/13 |
| 5-334762 | 12/1993 | Japan ................................... 369/13 |
| 6-20326 | 1/1994 | Japan ................................... 369/13 |
| 6-4805 | 1/1994 | Japan ................................... 369/13 |

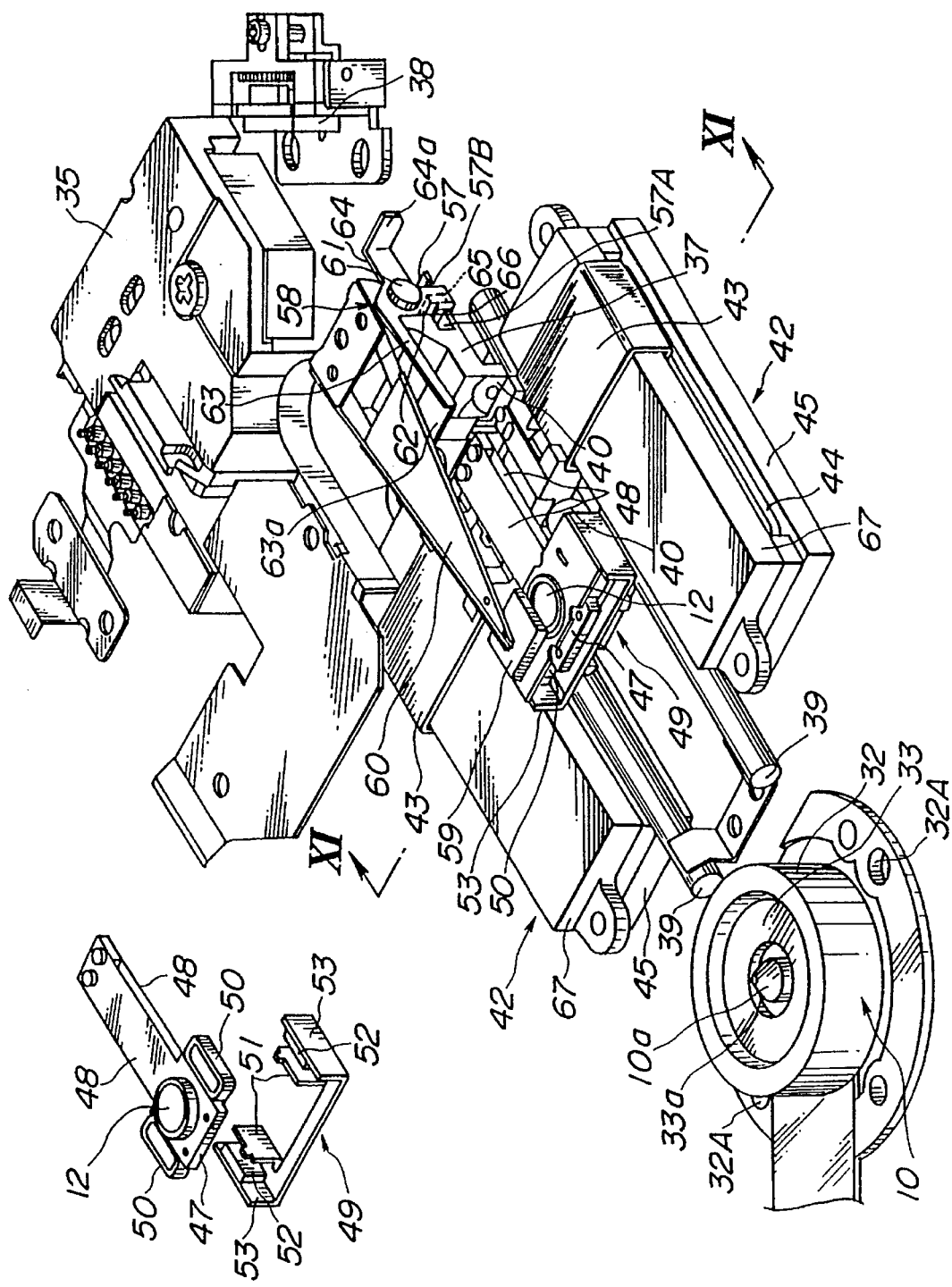

1

PHOTOMAGNETIC DISC DRIVE SYSTEM HAVING A LOCKING MECHANISM

This is a continuation of application Ser. No. 08/228,682 filed on Apr. 12, 1994, and now abandoned.

BACKGROUND OF THE INVENTION

The present invention relates to an apparatus for recording and/or reproducing information stored on a photomagnetic disc which is removably inserted into the apparatus.

Such apparatus includes a magnetic head producing magnetic field, and a mechanism adapted for moving the magnetic head into a loading position and an unloading position with respect to the photomagnetic disc. In the loading position, the magnetic head contacts the photomagnetic disc or is placed close thereto to apply magnetic field thereto. In the unloading position, the magnetic head is spaced away from the photomagnetic disc and prevented from applying magnetic field thereto.

Japanese Patent Application First Publication No. 3-104069 and Japanese Utility Model Application First Publication No. 3-80562 disclose magnetic head loading/unloading mechanisms including a piezoelectric actuator and a solenoid operated actuator, respectively. In these conventional apparatus, the piezoelectric actuator and the solenoid operated actuator must be continuously energized during loading and unloading movements of the magnetic head. In addition, the conventional apparatus necessitates two motors one of which is provided for driving the actuators and the other of which is provided for insertion and removal of the photomagnetic disc.

There is a demand to provide a photomagnetic disc recording/reproducing apparatus capable of reducing electric consumption and preventing any trouble or damage caused by emergent power down.

There is another demand to provide a photomagnetic disc recording/reproducing apparatus having a simple structure in which a common driving source is utilized for loading/unloading of the magnetic head and insertion/removal of the photomagnetic disc.

SUMMARY OF THE INVENTION

An object of the present invention is to provide a recording and/or reproducing apparatus for a photomagnetic disc which is improved in reducing power consumption.

Another object of the present invention is to provide a recording and/or reproducing apparatus for a photomagnetic disc which has a simple structure by utilizing a common driving source for loading/unloading of the magnetic head and insertion/removal of the photomagnetic disc.

According to one aspect of the present invention, there is provided an apparatus for recording and reproducing information stored on a photomagnetic disc, comprising:

a carriage carrying an objective lens and radially movable with respect to the photomagnetic disc;

a head support disposed on the carriage, the head support holding a magnetic head which applies magnetic field to the photomagnetic disc;

means for moving the head support between a loading position where the head support is placed close to the photomagnetic disc such that the magnetic head applies the magnetic field to the photomagnetic disc, and an unloading position where the head support is placed remote from the photomagnetic disc such that the magnetic head is prevented from applying the magnetic field to the photomagnetic disc; and means for retaining the head support at the loading position when the head support is moved to the loading position, and at the unloading position when the head support is moved to the loading position, the retaining means being disposed on the carriage and operatively connected with the moving means.

According to another aspect of the present invention, there is provided an apparatus for recording and reproducing information stored on a photomagnetic disc, including a magnetic head which produces magnetic field, comprising:

a carriage radially movable with respect to the photomagnetic disc;

means for supporting the magnetic head, the supporting means being movably disposed on the carriage with respect to the photomagnetic disc, the head support having a loading position where the magnetic head is disposed in contact with the photomagnetic disc to apply the magnetic field thereto and an unloading position where the magnetic head is disposed remote from the photomagnetic disc to be prevented from applying the magnetic field thereto;

means for locking the supporting means to prohibit the movement off the supporting means into the loading position, the locking means being shiftable between a locking position where the locking means engages the supporting means and a release position where the locking means disengages the supporting means;

means for driving the locking means, the driving means being so constructed as to be energized during shifting movement of the locking means between the locking position and the release position; and means for retaining the head supporting means at the loading and unloading positions, respectively, the retaining means being disposed on the carriage and the head supporting means.

BRIEF DESCRIPTION OF THE DRAWINGS

FIG. 9 is a perspective view of an optical pickup mechanism;

FIG. 10 is an exploded view showing a lens holder of the optical pickup mechanism;

DESCRIPTION OF THE PREFERRED EMBODIMENT

Figure 1:
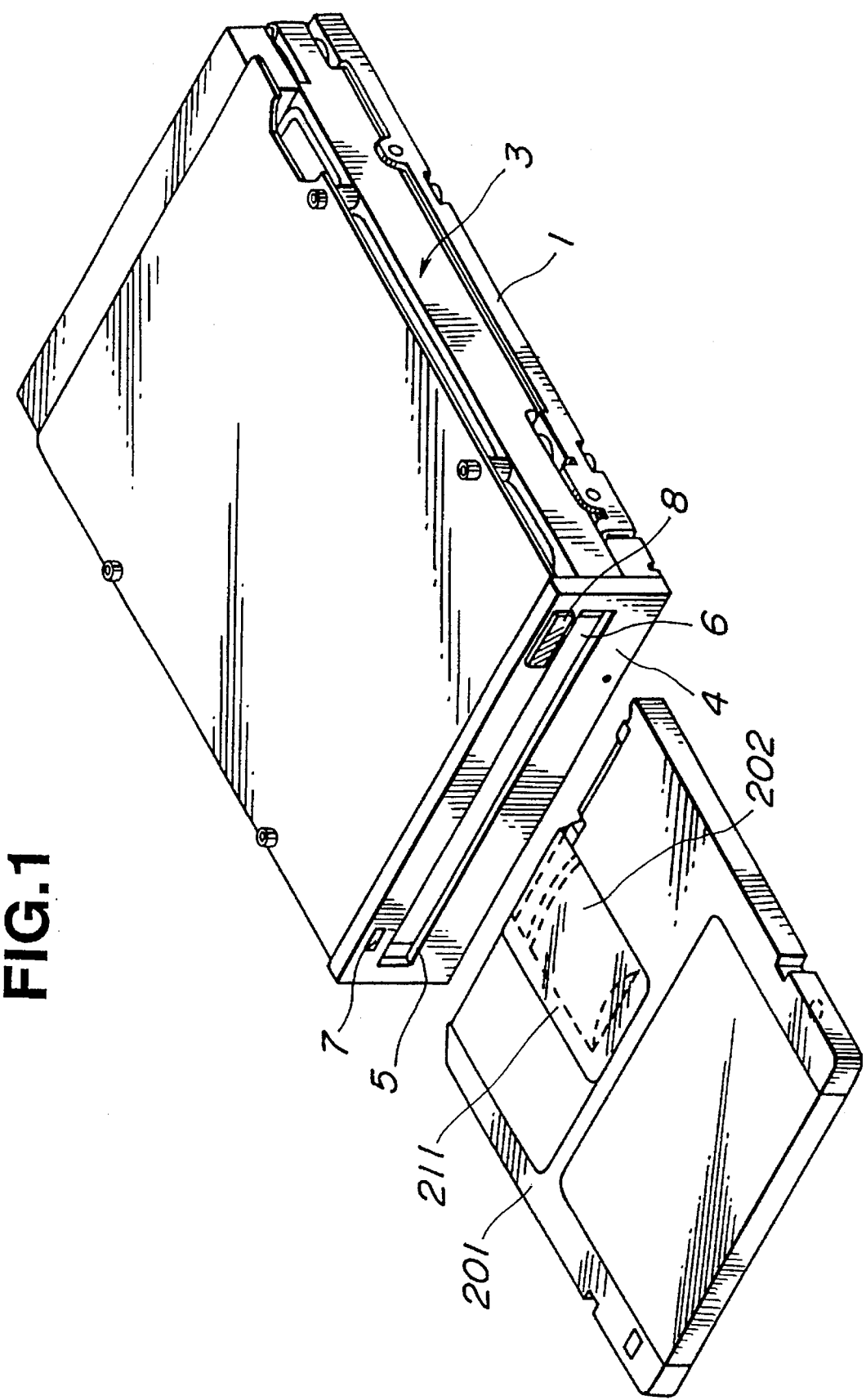
FIG. 1 is a perspective view of a preferred embodiment of a photomagnetic recording/reproducing apparatus according to the present invention and a disc cartridge storing a photomagnetic disc.

Referring to FIG. 1, there are shown an apparatus for recording and/or reproducing information stored on a photomagnetic disc 202, according to the present invention, and a disc cartridge 201 storing the photomagnetic disc 202.

Figure 2:
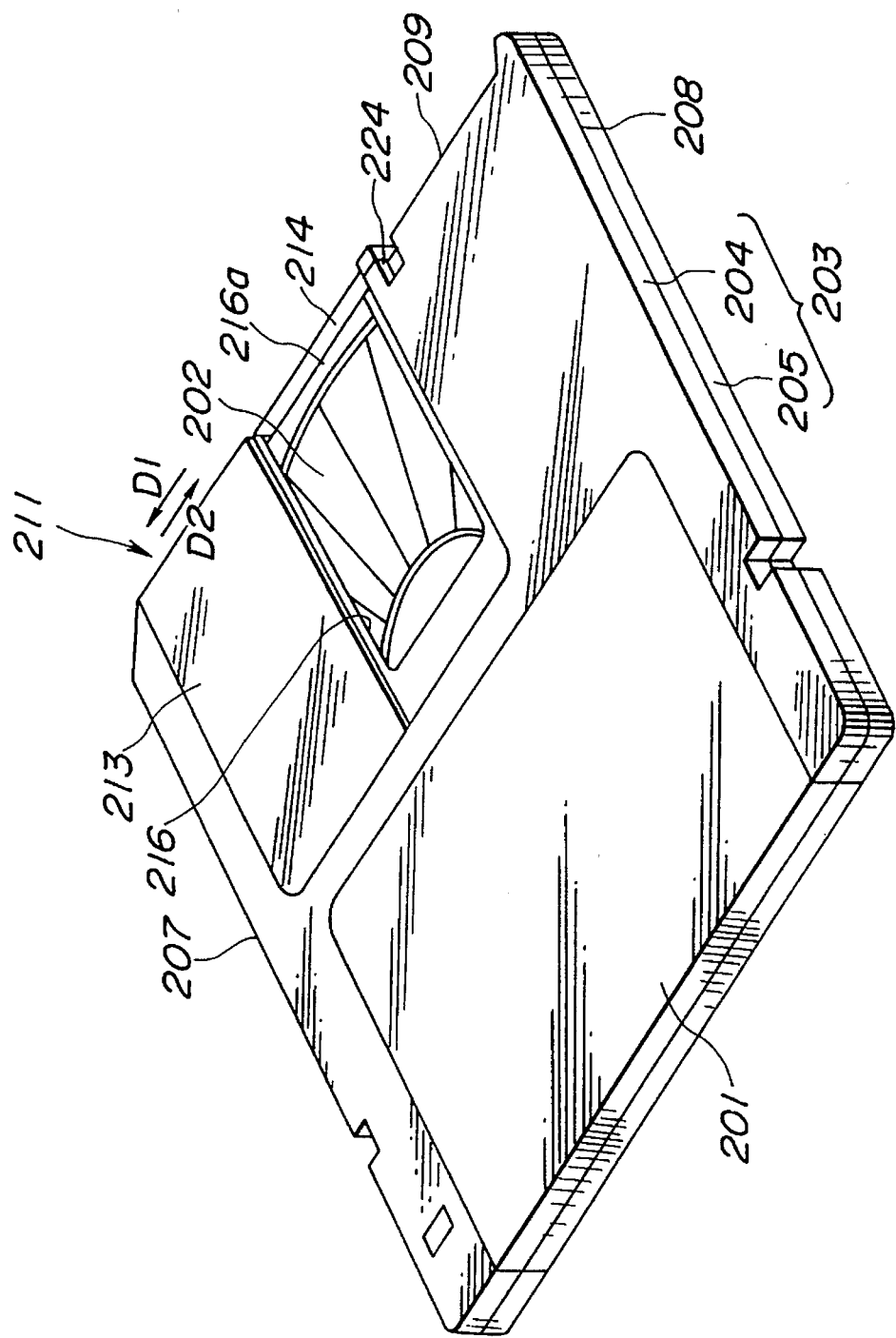
FIG. 2 is a perspective view of the disc cartridge, showing one end face thereof.
Figure 3:
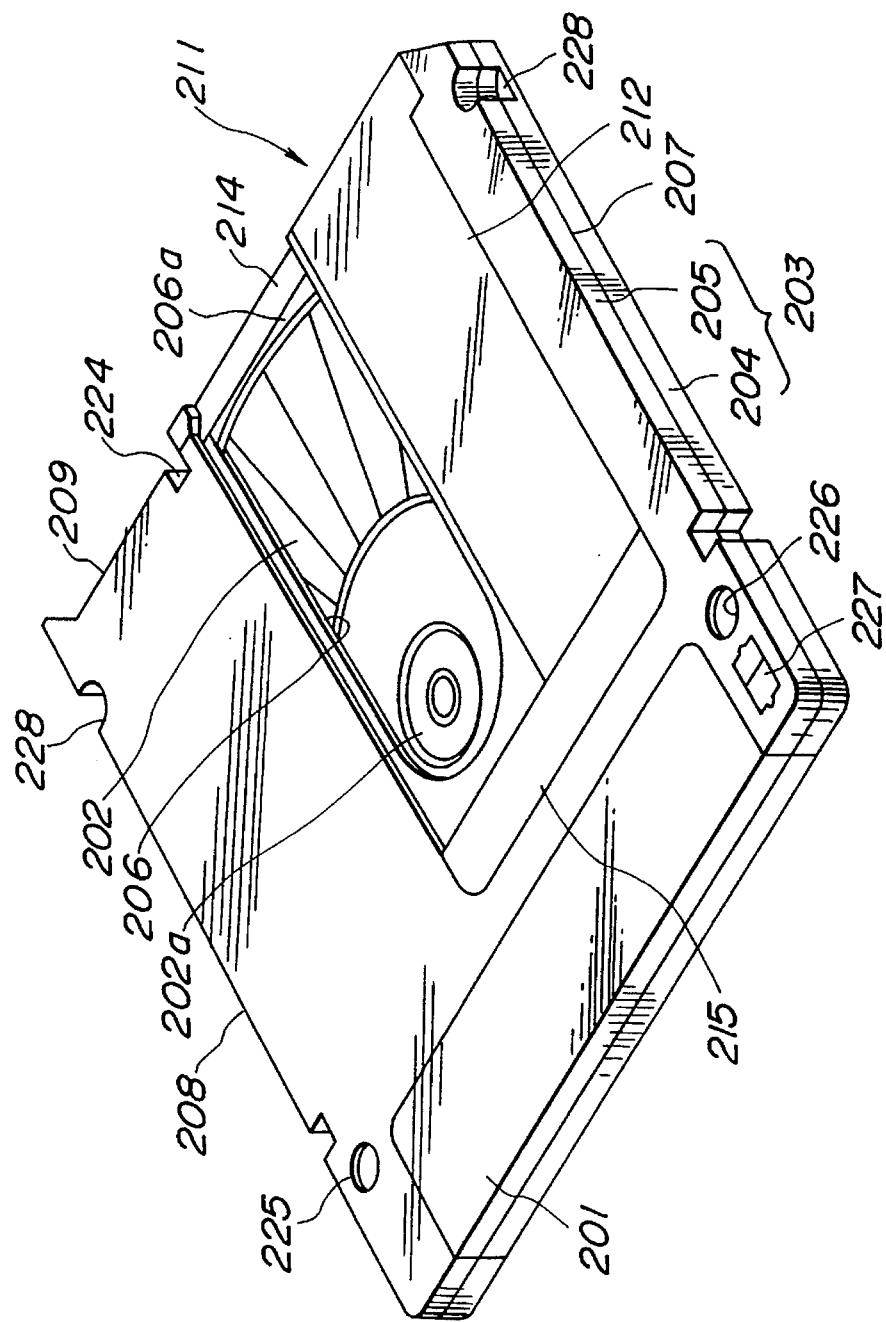
FIG. 3 is a perspective view of the disc cartridge showing the other end face thereof.

Referring to FIGS. 2 and 3, the disc cartridge 201 will now be described. As shown in FIGS. 2 and 3, the disc cartridge 201 includes the photomagnetic disc 202 and a generally rectangular casing 203 in which the photomagnetic disc 202 is rotatably disposed. The photomagnetic disc 202 has a data storage area formed with a magnetic recording layer in and from which information signals are written and/or read out. One end face of the photomagnetic disc 202 serves for storage of information signals. Numeral 202a denotes a circular chucking hub as shown in FIG. 3.

As shown in FIGS. 2 and 3, the casing 203 includes two upper and lower halves 204 and 205 joining to form a unitary box-shaped body which has an inner space for storing the photomagnetic disc 202. The casing 203 has one end face 209 formed with a rectangular groove 224 and opposed side faces 207 and 208 which are connected with the end face 209 and formed with a semi-circular groove 228.

As shown in FIG. 3, there are provided with a pair of holes 225 and 226 near its opposed side edges. Disposed adjacent the hole 226 on the lower half 205 is an erroneous erasure inhibiting member 227 for selectively prohibiting writing information signals on the photomagnetic disc 202. A first rectangular opening 206 is formed on the lower half 205 and extends from the side edge adjacent the end face 209 toward the mid-portion. The first opening 206 exposes the chucking hub 202a and a portion of the information signals storage end face of the photomagnetic disc 202 to outside of the casing 203. When the disc cartridge 201 is inserted into the apparatus, the chucking hub 202a faces a disc driving motor as mentioned below and the portion of the information signals storage end face is opposed to an optical pickup mechanism as described below.

Referring back to FIG. 2, the upper half 204 is formed with a second rectangular opening 216 extending from the one side edge toward the other side edge. The second opening 216 is arranged in opposed relation to the first opening 206 but has a smaller distance between the opposed side edges than the First opening 206. The second opening 216 exposes a portion of the other end face of the photomagnetic disc 202 to face a magnetic head as described below, in an opposed manner when the disc cartridge 201 is inserted into the apparatus.

As seen in FIGS. 2 and 3, cutouts 216a and 206a are respectively formed at the side edges of the upper and lower halves 204 and 205, through which the magnetic head and the optical pickup mechanism readily enter into the first and second openings 206 and 216.

As shown in FIGS. 2 and 3, a shutter 211 is disposed on the disc cartridge 208 to be slidable in directions as indicated by arrows D1 and D2. The shutter 211 includes a first shutter member 212 on the lower half 205, a second shutter member 213 on the upper half 204 disposed in parallel with the first shutter member 212, and a connecting portion 214 joining the first and second shutter members 212 and 213. The first and second shutter members 212 and 213 have a size sufficient to close the first and second openings 206 and 216, respectively. The first shutter member 212 is retained at a rear end thereof by a shutter holder 215, thereby being prevented from standing-up on the lower half 205 and kept in place. The shutter 211 is normally biased in such a direction as to close the first and second openings 206 and 216, by means of a coil spring (not shown) which is interposed between the disc cartridge 203 and the connecting portion 214.

Figure 4:
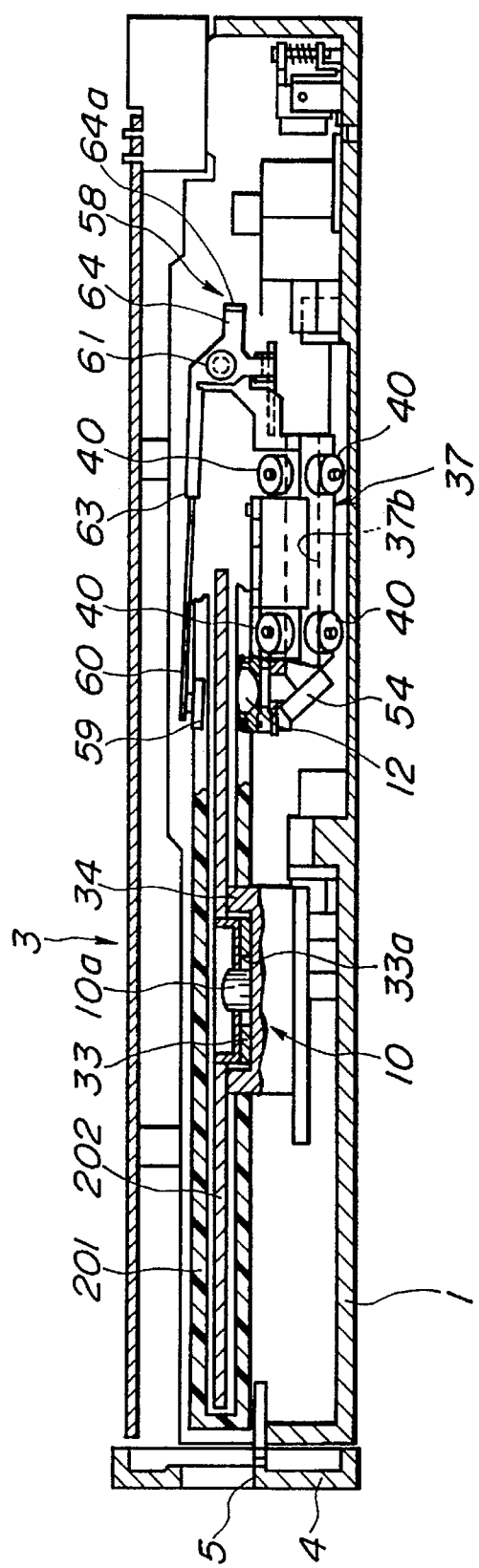
FIG. 4 is a sectional view of the recording/reproducing apparatus in which the disc cartridge is loaded.

Referring back to FIG. 1 and FIG. 4, the photomagnetic disc recording/reproducing apparatus includes a chassis 1 of a generally U shape in section, a body 3 which is disposed on the chassis 1 and accommodates components serving For recording and reproducing information stored on the photomagnetic disc 202. As shown in FIG. 4, a front panel 4 is disposed on a front face of the body 3 and formed with an inlet/outlet opening 5 through which the disc cartridge 201 is inserted into and removed from the apparatus. The inlet/outlet opening 5 is covered with a lid 6 which is rotatably disposed on the front panel 4 to prevent entry of dusts into inside of the apparatus. Numerals 7 and 8 denote a light emitting element for display of recording/reproducing operating condition and an eject button for removal of the disc cartridge 201 from the apparatus, respectively.

Figure 5:
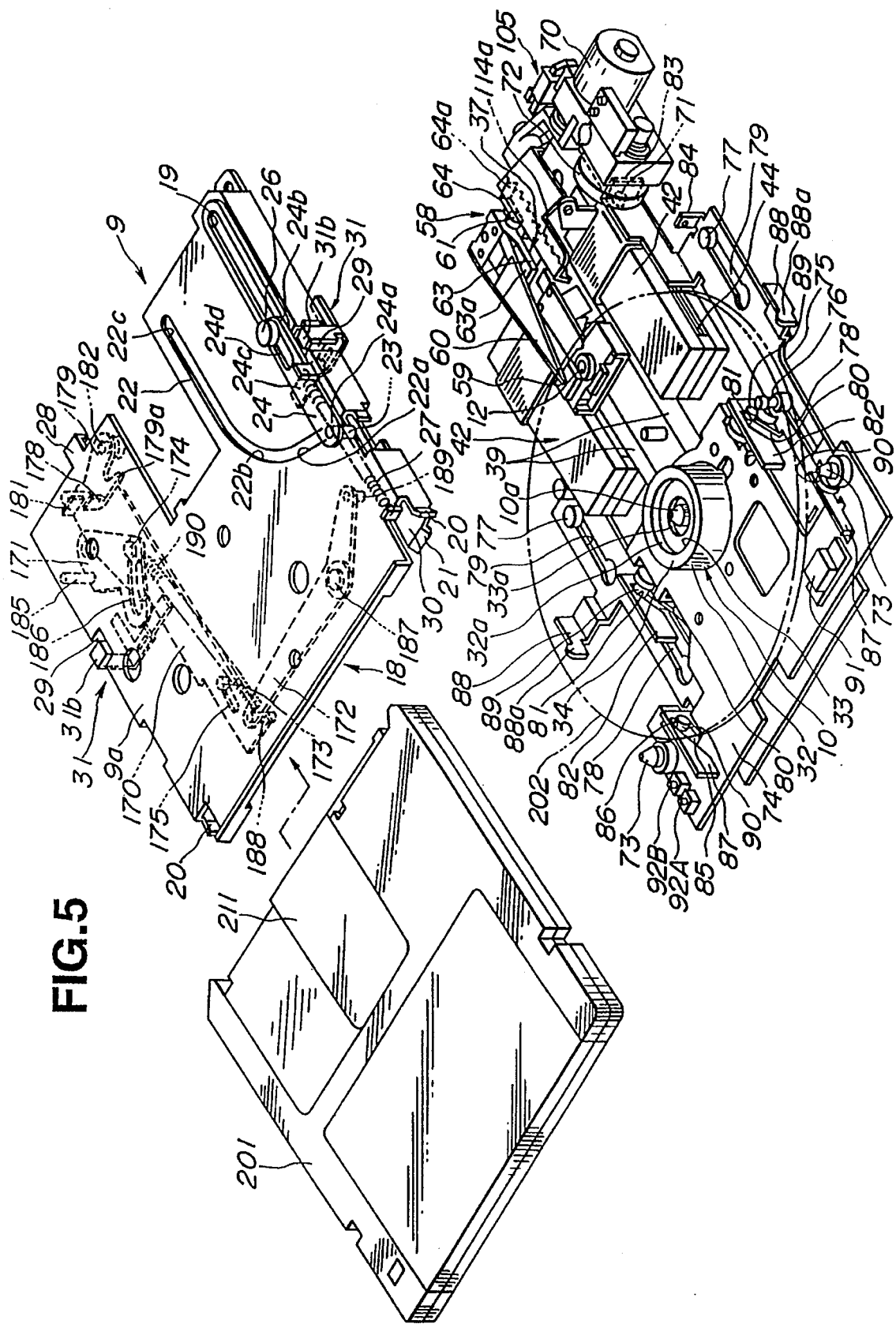
FIG. 5 is an exploded view of the recording/reproducing apparatus showing a cartridge holder into which the disc cartridge is inserted.
Figure 6:
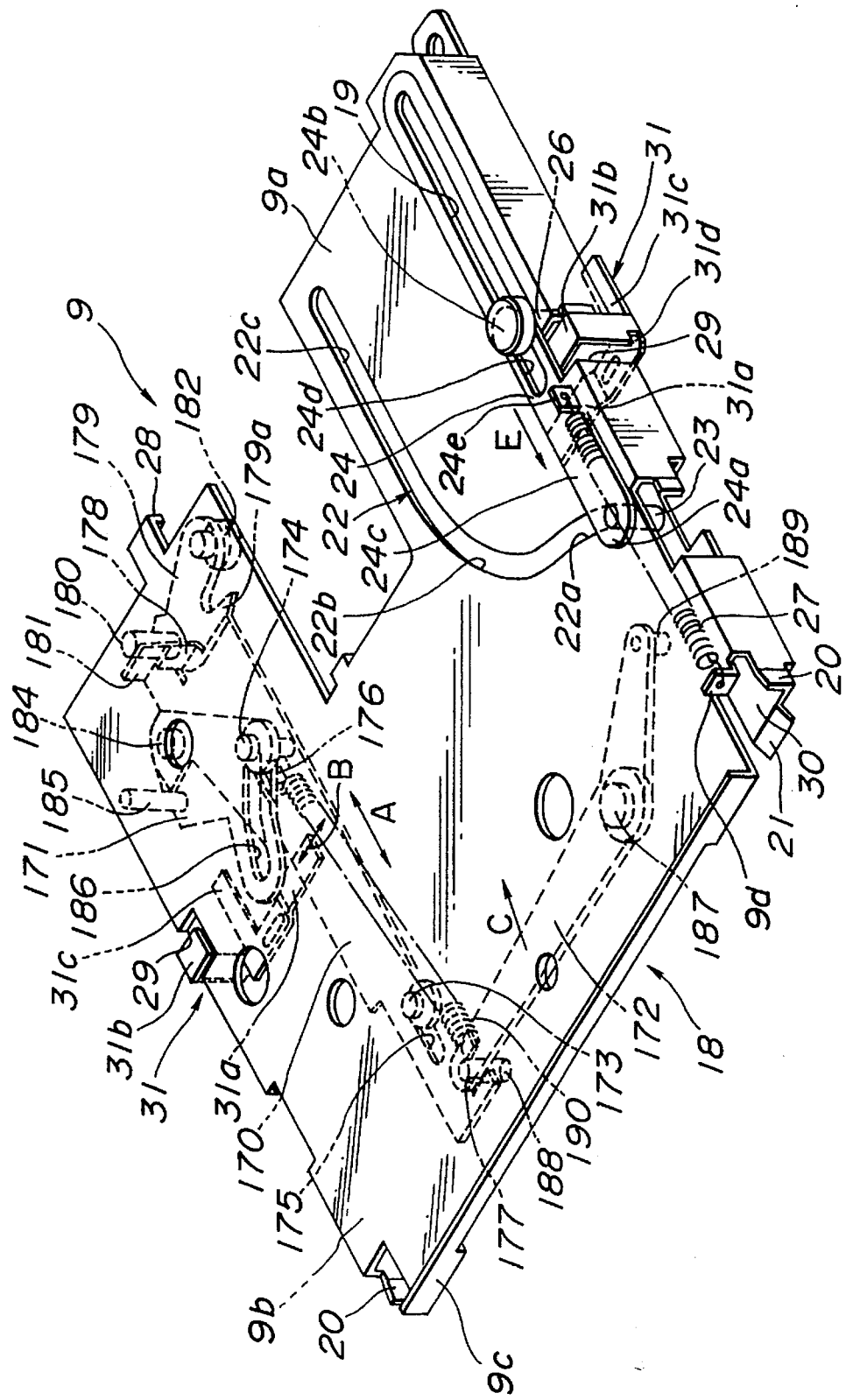
FIG. 6 is an enlarged view of the cartridge holder of FIG. 5.
Figure 7:
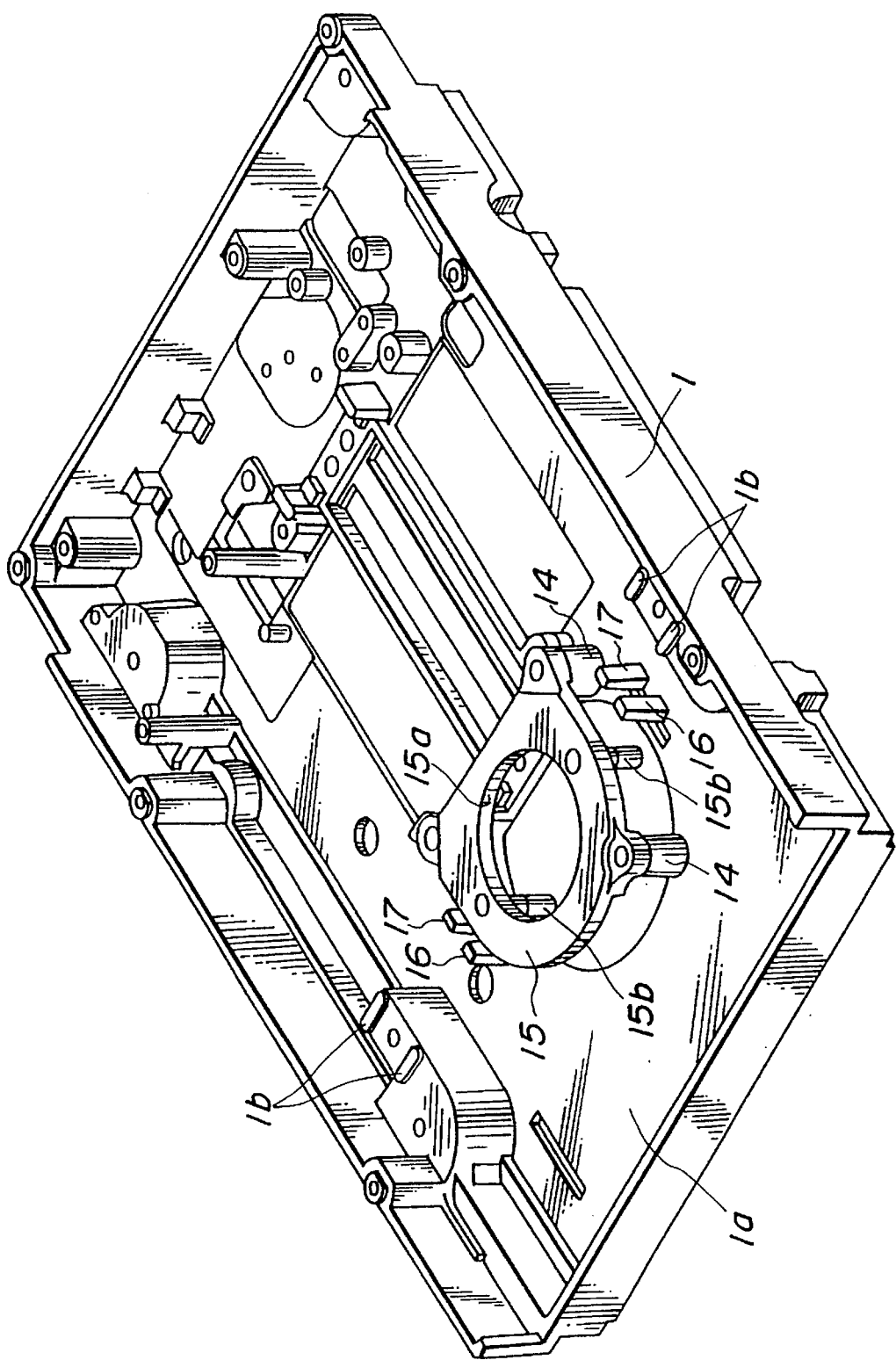
FIG. 7 is a perspective view of a chassis of the recording/reproducing apparatus.

Referring to FIG. 7, the chassis 1 includes a bottom wall 1a and cartridge holder mounts 1b disposed on a front section of the bottom wall 1a at a predetermined height level. Secured to the cartridge holder mounts 1b is a cartridge holder 9 as shown in FIGS. 5 and 6.

As best shown in FIG. 6, the cartridge holder 9 is of a generally flat box shape and includes top and bottom walls 9a and 9b and a front wall 9c connected with the top wall 9a. The front wall 9c is formed with an opening 18 through which the disc cartridge 201 is inserted into and removed from the cartridge holder 9. A stop 28 is disposed on a rear end of the top wall 9a and projects outward therefrom. As seen in FIG. 6, the stop 28 is formed with a downward bent portion which abuts onto the end face 209 of the disc cartridge 201 when the disc cartridge 201 is inserted into the apparatus and placed at a loading position where the disc cartridge 201 can be subject to recording/reproducing off information stored in the photomagnetic disc 202. Opposed side walls are connected with the top wall 9a and formed with guide portions 20 and 21 disposed adjacent the opening 18. The guide portions 20 and 21 guide the disc cartridge 201 upon insertion and removal thereof. The side walls also are formed with cutouts 29 receiving cartridge urging members 31 which are attached to the bottom wail 9b as seen in FIG. 6. The cartridge urging members 31 serve for urging the disc cartridge 201 against cartridge supporting sections 30 formed on the guides 21. Each of the cartridge urging members 31 includes a base 31a secured to the bottom wall 9b, a reversed L-shaped cartridge contact portion 31b, a joint portion 31d connecting the base 31a and the contact portion 31b, and a stopper portion 31c extending rearward from a lower end of the cartridge contact portion 31b, as shown in FIG. 6. The reversed L-shaped cartridge contact portion 31b is allowed to contact the upper half 204 of the disc cartridge 201 when the disc cartridge 201 is placed at the loading position. The stopper portion 31c serves for preventing the cartridge contact portion 31b from contacting the upper half 204 when the disc cartridge 201 is placed out of the loading position. The joint portion 31d is downward inclined with respect to the base 31a so as to prevent interference with an urging tab 88 of a slide plate 75 which is forward and rearward movably disposed on the bottom wall 1a of the chassis 1 as shown in FIG. 5.

The cartridge holder 9 includes a shutter opening mechanism for automatically opening the shutter 211 in response to the insertion of the disc cartridge 201. As best shown in FIG. 6, the shutter opening mechanism includes first and second cam grooves 19 and 22 formed on the top wall 9a, a flanged guide pin 26 engaged with the first cam groove 19, a shutter opening pin 23 engaged with the second cam groove 22, and a link 24 connecting the guide pin 26 and the shutter opening pin 23. As seen in FIG. 6, the first cam groove 19 extends forward from the rear portion of the top wall 9a along the side edge thereof and receives the flanged guide pin 26. The link 24 includes a body portion 24c having one end 24b formed with an oval guide hole 24d and the other end 24a provided with the shutter opening pin 23 which extends downward therefrom. The shutter opening pin 23 is received in the second cam groove 22 to be movable therealong. The second cam groove 22 includes a diagonal portion 22a tilting toward the rear edge of the top wall 9a, an arcuate portion 22b continuously connected with the diagonal portion 22a, and a straight portion 22c extending from the arcuate portion 22b in substantially parallel with the side edge of the top wall 9a as seen in FIG. 6. A coil spring 27 is connected with an upright portion 24e of the link 24 at one end thereof and with an upright portion 9d formed at the front edge of the top wall 9a at the other end thereof so as to bias the link 24 in a direction as indicated by the arrow E of FIG. 6.

The cartridge holder 9 also includes a disc eject/inject mechanism for moving the disc cartridge 201 to the loading position and out of the loading position. As best shown in FIG. 6, the disc eject/inject mechanism includes a first injection plate 170, a second injection plate 171 and a third injection plate 172 which are movably disposed on the bottom wall 9b of the cartridge holder 9, respectively. The first injection plate 170 extending between the front and rear portions of the bottom wall 9b is supported by a pair of guide pins 173 and 174 which project upward from the bottom wall 9b as viewed in FIG. 6. The guide pins 173 and 74 are movably received in guide slots 175 and 176 formed on the first injection plate 170. The first injection plate 170 is movable with respect to the bottom wall 9b in directions as indicated by the arrow A of FIG. 6, namely in directions of the insertion and removal of the disc cartridge 201.

Figure 25:
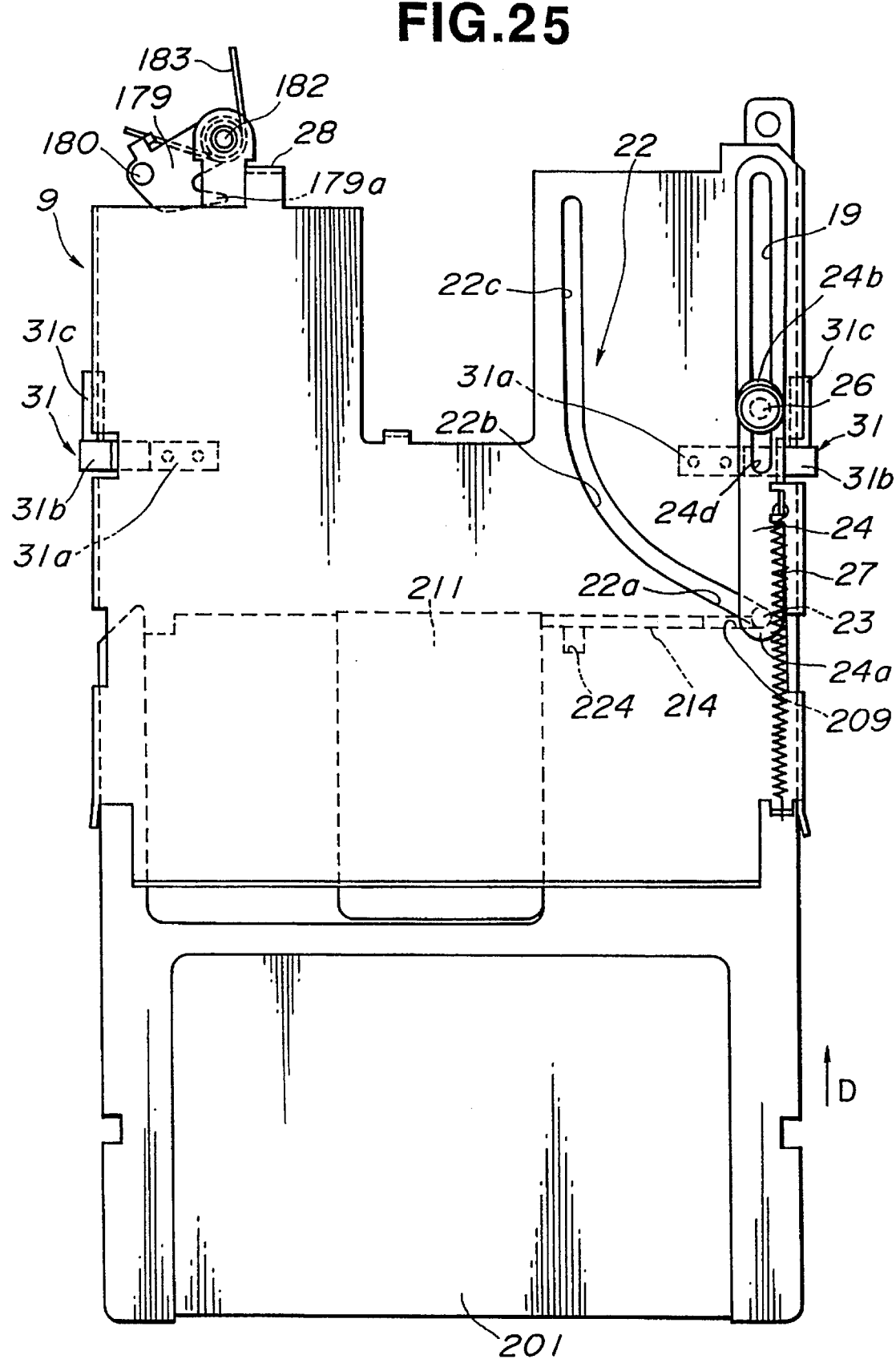
FIGS. 25–28 are explanatory views showing an operation of opening a shutter of the disc cartridge when the disc cartridge is inserted into the cartridge holder.
Figure 31:
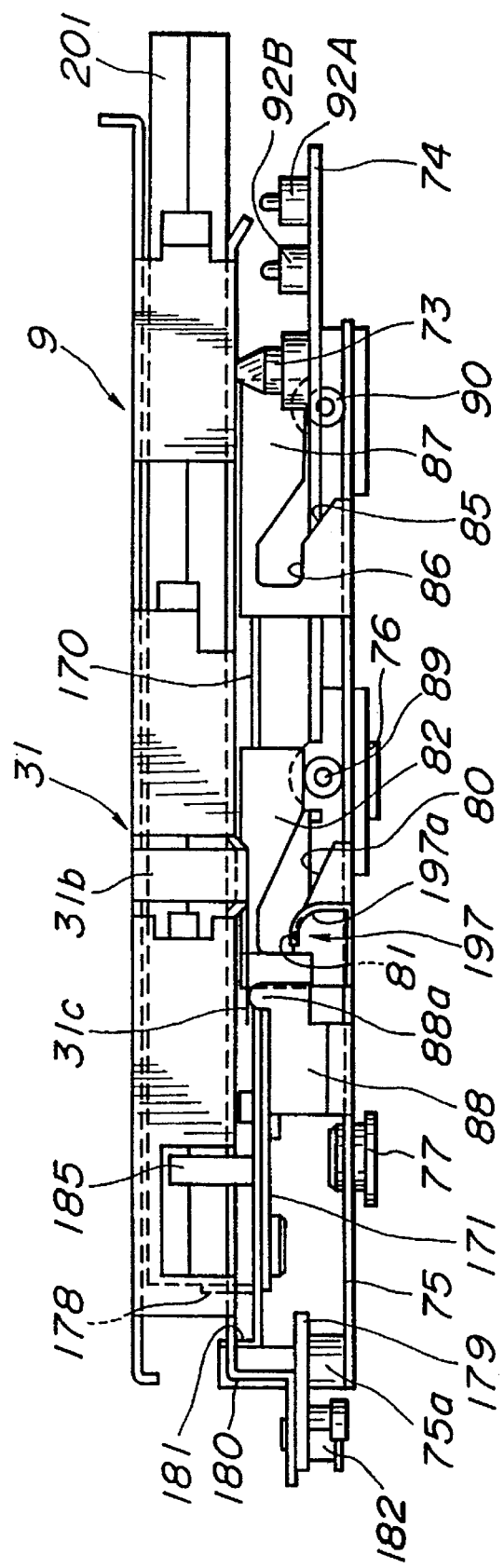
FIG. 31 is a left side view of FIG. 29.
Figure 32:
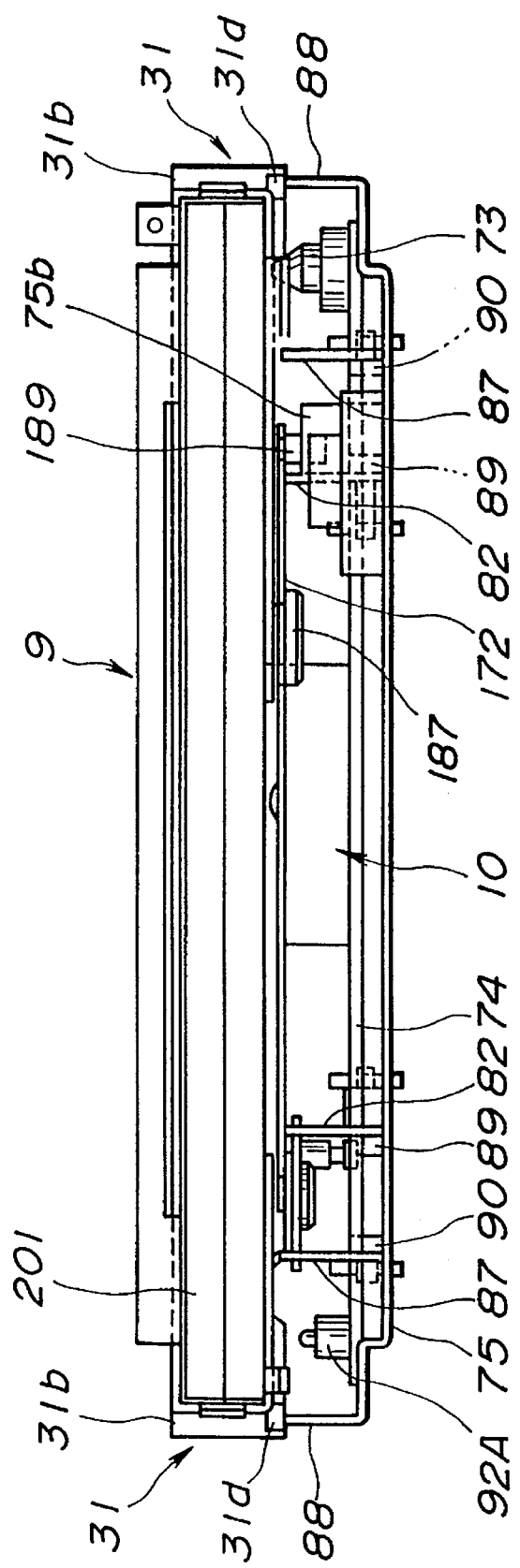
FIG. 32 is a front elevation of FIG. 29.

The first injection plate 170 has at a rear end thereof a shutter contact portion 178 as seen in FIG. 6, which is engageable with the shutter 211 of the disc cartridge 201. The first injection plate 170 also is provided at the rear end with a trigger arm rotating portion 181 extending uprightly therefrom. The trigger arm rotating portion 181 contacts a trigger arm pin 180 which is uprightly disposed on a trigger arm 179 as shown in FIG. 6. The trigger arm 179 is pivotally disposed on the chassis 1 around an axis 182 as seen in FIG. 6. The trigger arm 179 is formed with a latch 179a engageable with a slide plate engaging pin 75a which is disposed on the slide plate 75 as seen in FIG. 31. The trigger arm 179 is biased by a torsion spring 183 as shown in FIG. 25, in such a rotational direction that the latch 179a engages the slide plate engaging pin 75a.

The second injection plate 171 is pivotally disposed around an axis 184 which is uprightly disposed on the rear portion of the bottom wall 9b of the cartridge holder 9 as seen in FIG. 6. The second injection plate 171 is formed with a cartridge holding pin 185 engageable with one of the groove 228 of the disc cartridge 201, and a cam groove 186 engaged with the guide pin 174 which passes through the guide slot 176. Thus, the second injection plate 171 pivotally moves around the axis 184 in directions as indicated by the double-headed arrow B of FIG. 6. The cartridge holding pin 185 is so arranged as to be placed in opposed relation to the groove 228 when the disc cartridge 201 is inserted into the cartridge holder 9, and then to be engaged with the groove 228 by the pivotal motion of the second injection plate 171.

Figure 30:
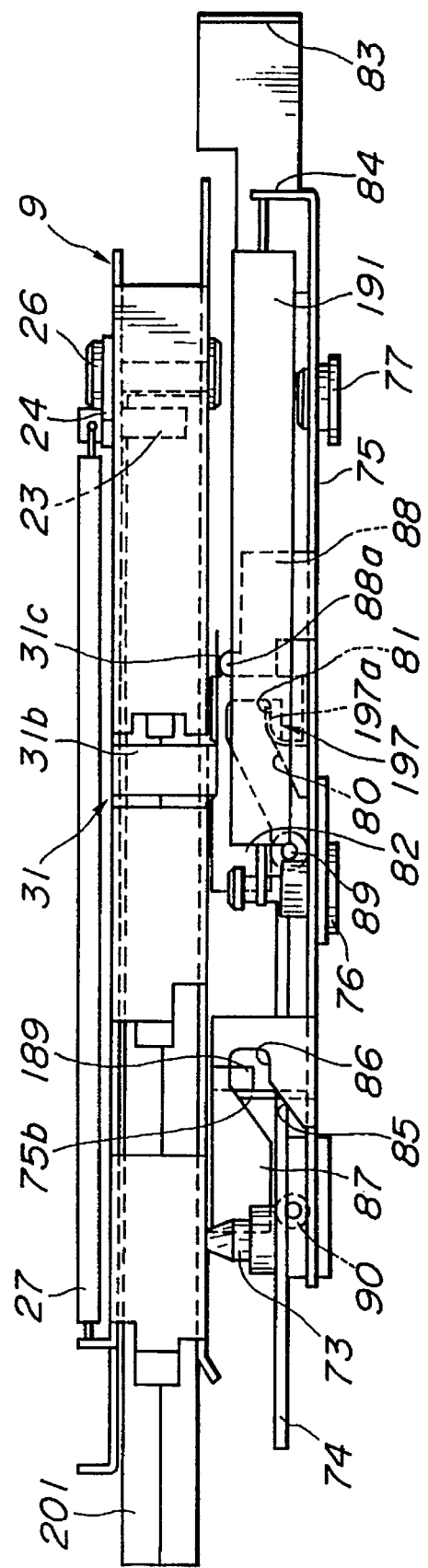
FIG. 30 is a right side view of FIG. 29.

As best shown in FIG. 6, the third injection plate 172 is pivotally disposed around an axis 187 provided on the front portion of the bottom wall 9b of the cartridge holder 9. The third injection plate 172 has one end portion formed with a connecting pin 188 extending therefrom downward as viewed in FIG. 6. The connecting pin 188 engages a notch 177 which is so disposed on a front end portion of the first injection plate 170 as to open in a direction perpendicular to the directions of the insertion and removal of the disc cartridge 201. A pin 189 is formed on the other end of the third injection plate 172 and engageable with an injection plate retaining portion 75b as shown in FIGS. 30 and 31, of the slide plate 75. A coil spring 190 is disposed between the connecting pin 188 and the guide pin 174 to bias the third injection plate 172 in a direction as indicated by the arrow C of FIG. 6.

Figure 8:
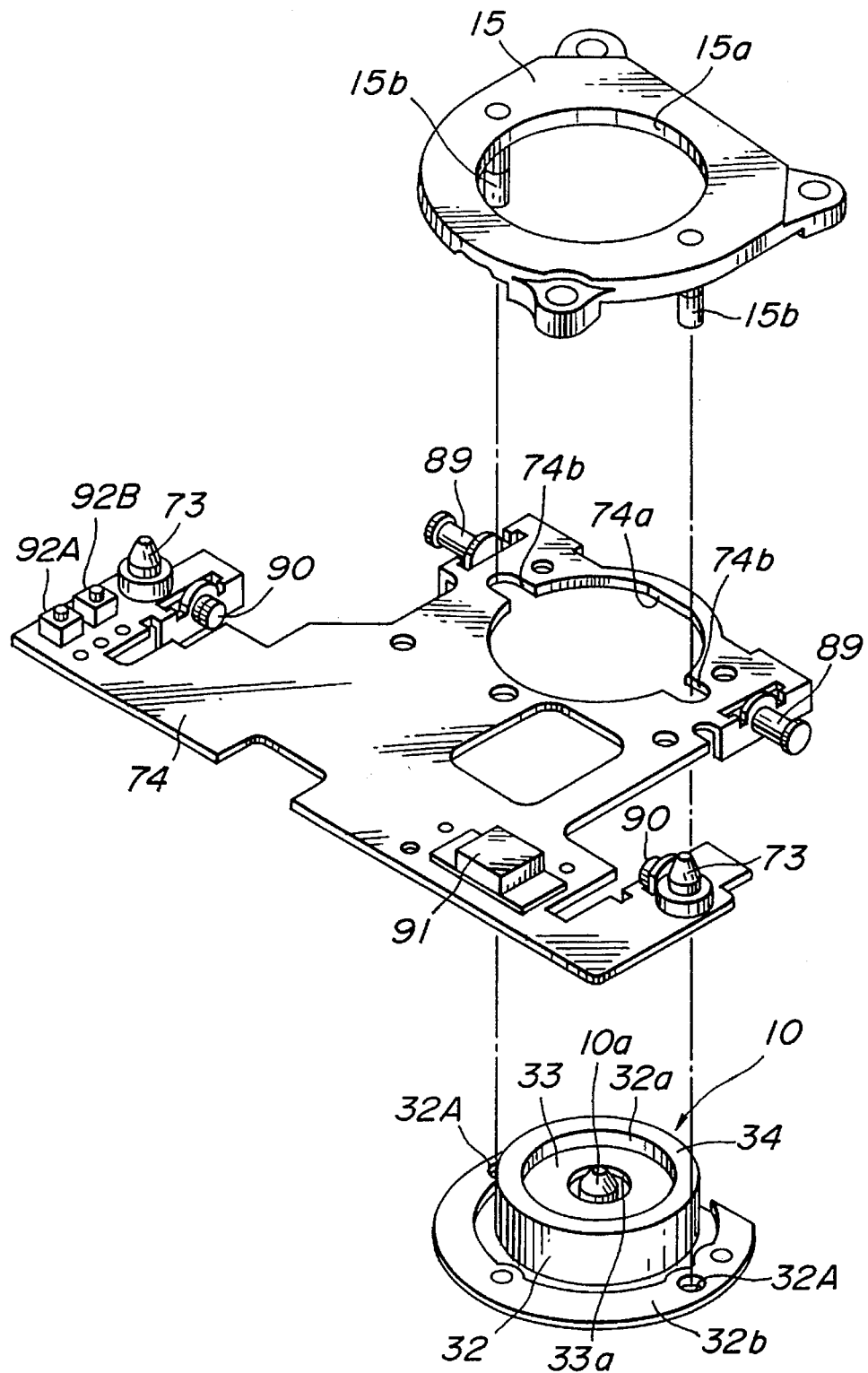
FIG. 8 is an exploded view showing a spindle motor, a motor positioning member, and an elevating plate.

Referring back to FIG. 4, a spindle motor 10 rotatably driving the ptotomagnetic disc 202 is movably disposed at a front section of the chassis 1 with respect to one end face of the photomagnetic disc 202. As shown in FIGS. 7 and 8, the spindle motor 10 is held in place by a motor positioning member 15 of a generally annular shape which is disposed on the bottom wall 1a of the chassis 1. As seen in FIG. 7, the motor positioning member 15 is secured to a plurality of ribs 14 which are spaced at a predetermined distance apart from each other on the bottom wall 1a. Two pairs of guide posts 16 and 17 are disposed outside the ribs 14 on the bottom wall 1a in opposed relation. The motor positioning member 15 is formed with an opening 15a through which the spindle motor 10 is vertically movable relative to the bottom wall 1a. Guide pins 15b extend from a lower surface, as viewed in FIG. 7, of the motor positioning member 15 and are fixed on the bottom wall 1a.

As shown in FIG. 8, the guide pins 15b are inserted into guide holes 32A era spindle holder 32. The spindle holder 32 receives the spindle motor 10 and has a cylindrical body and a mount portion 32b extending radially from a lower end off the body. The cylindrical body is formed with a recess 32a in which a spindle shaft 10a and an annular magnet 33 are disposed. The spindle shaft 10a is inserted through an opening 33a of the annular magnet 33. The magnet 33 attracts the chucking hub 202a of the photomagnetic disc 202 placed on a peripheral flat edge of the recess 32a which acts as a disc table 34. The disc table 34 is so designed as to be positioned at a lower height level than a tip end of the so to the lower end of the spindle shaft 10a with respect body.

As best shown in FIG. 8, disposed between the motor positioning member 15 and the spindle holder 32 is a generally T-shaped elevating plate 74 which is movably disposed on the slide plate 75 as seen in FIG. 5. The elevating plate 74 is formed at its rear portion with an opening 74a through which the body of the spindle holder 32 projects upward as viewed in FIG. 8, and with grooves 74b which are so disposed adjacent the opening 74a as to receive the guide pins 15b of the motor positioning member 15. A pair of first pins 89 are rotatably disposed on opposed side edges of the rear portion of the elevating plate 74 and project outward therefrom as seen in FIG. 8. Each of the first pins 89 is disposed between the guide posts 16 and 17 on the bottom wall 1a of the chassis 1. As shown in FIG. 8, a pair of cartridge positioning pins 73 are disposed on opposed wing portions of the T-shaped elevating plate 74. The positioning pins 73 serve For positioning of the disc cartridge 201 at a predetermined height level relative to the elevating plate 74. Numerals 91, 92A, and 92B of FIG. 8 denote a thermal sensor, a light protector switch, and a disc type detecting switch, respectively. A pair of second pins 90 are rotatably disposed on side edges of the opposed wing portions and project inward therefrom as seen in FIG. 8. The first pins 89 are engaged with cam grooves of first brackets 82 of the slide plate 75 as shown in FIG. 5 and the second pins 90 are caged with cam grooves of second brackets 87 thereof.

Referring back to FIG. 5, the slide plate 75 now will be described. The first brackets 82 of a generally L shape are disposed uprightly at a middle section and spaced apart from opposed left and right side edges as viewed in FIG. 5, of time slide plate 75 of a generally U shape. The cam groove of each of the first brackets 82 includes a diagonal portion 80 slanting forward and downward as viewed in FIG. 5, and a horizontally extending portion 81 continuously extending from the upper end of the diagonal portion 80. The second brackets 87 of a generally L shape are disposed uprightly on the opposed left and right side edges of a front section of the slide plate 75. Each of the cam grooves of the second brackets 87 includes a diagonal portion 85 slanting forward and downward as viewed in FIG. 5, and a horizontally extending portion 86 continuously extending from the upper end of the diagonal portion 85. The diagonal portion 85 makes a larger angle with respect to an upright portion of the L-shaped second bracket 87 than the diagonal portion 80 of the L-shaped first bracket 82. The cam grooves of the first and second brackets 82 and 87 allow the first pins 89 and the second pins 90 to move therealong in engaging relation. Thus, the elevating plate 74 supporting the spindle motor 10 is allowed to move relative to the slide plate 75 during the movement off the first and second pins 89 and 90.

As shown in FIG. 5, a pair of slots 78 are disposed between the first and second brackets 82 and 87 and extend along the opposed side edges of the slide plate 75. A spring mount pin 76 extending uprightly from the bottom wall 1a off the chassis 1 is engaged with each of the slots 78. A pair of slots 79 extend rearward from the middle section of the slide plate 75 along the opposed side edges thereof, as seen in FIG. 5. The slots 79 receive a pair of guide pins 77 secured to the bottom wall 1a of the chassis 1.

Figure 29:
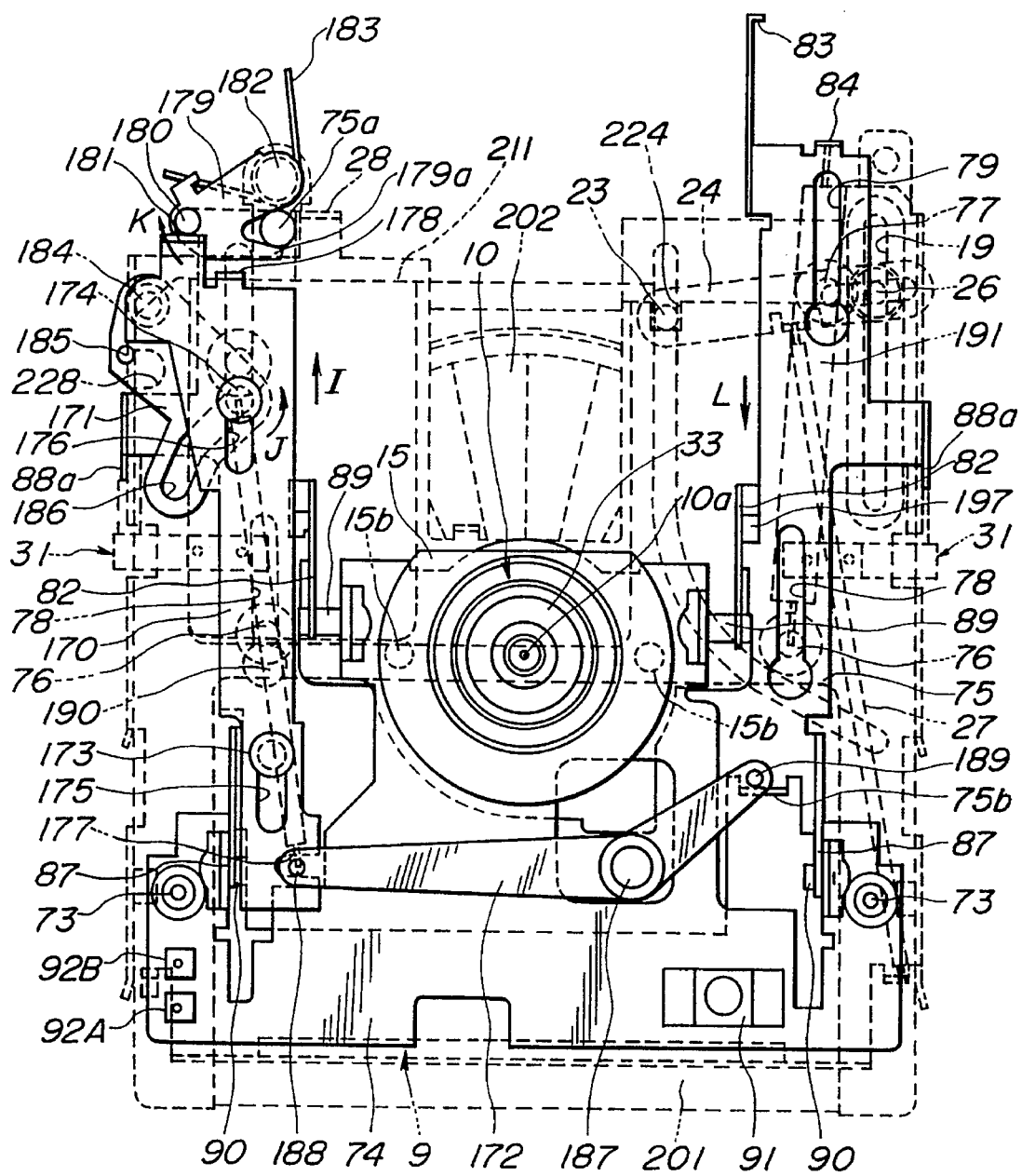
FIG. 29 is a plan view showing the disc cartridge unloaded in the cartridge holder.

As seen in FIG. 5, a spring mount tab 84 is disposed near one off the slots 79 and extends uprightly so as to be opposed to one off the spring mount pins 76. A return coil spring 191 as indicated in a phantom line in FIG. 29, is disposed between the spring mount tab 84 and the spring mount pin 76 to bias the slide plate 75 forward, viz. in such a direction that the disc cartridge 201 is loaded in the chassis 1. Thus, the slide plate 75 is allowed to move forward and rearward on the bottom wall 1a of the chassis 1. An engaging tab 83 is disposed at the rear end of the slide plate 75 and extends outward and laterally therefrom as shown in FIG. 5. The engaging tab 83 serves for rearward movement of the slide plate 75 on the bottom wall 1a of the chassis 1.

Disposed adjacent the first brackets 82 are a pair of spring members 197 as shown in FIG. 29. The spring members 197 are formed of a metal sheet and with upward bent portions 197a as shown in FIG. 30. The upward bent portions 197a contact the first pins 89 of the elevating plate 74 which are engaged with the horizontally extending portions 81 of the cam grooves. The upward bent portions 197a bias the first pins 89 upward as viewed in FIG. 5 and retain the elevating plate 74 with the spindle motor 10 at an upper-most position.

The urging tabs 88 are formed on the opposed side edges of the slide plate 75 and extend therefrom outward and is bent upward as viewed in FIG. 5. The urging tabs 88 have at distal ends thereof protrudent portions 88a which urge the cartridge urging members 31 of the cartridge holder 9 upward as viewed in FIG. 5.

Referring to FIGS. 5 and 9, an optical pickup mechanism disposed at a rear section of the chassis 1, is now described. The optical pickup mechanism is of a composite type which constitutes of a plurality of elements individually disposed on the chassis 1. Among them, movable elements are reduced in weight for high speed accessibility. As best shown in FIG. 9, the optical pickup mechanism includes a fixed optical device 35 secured to the chassis 1, a carriage 37 with an objective lens 12 which is movably disposed on the chassis 1, and a Galvano-mirror 88 pivotally supported on the chassis 1. The fixed optical device 35, the carriage 37, and the Galvano-mirror 38 are so arranged as to be of a generally L shape as seen in FIG. 9, in which the Galvano-mirror 38 is placed at the corner.

The fixed optical device 35 comprises laser diode acting as light source for recording/reproducing of information, signal detectors which are used for focusing/tracking anti detecting recorded information, respectively. File Galvano-mirror 38 reflects light beam emitted from the fixed optical device 35 to transmit the light beam to the objective lens 12 of the carriage 37. The pivotal motion of the Galvano-mirror 38 causes change in angle of reflection of light beam to serve for tracking control.

Figure 11:
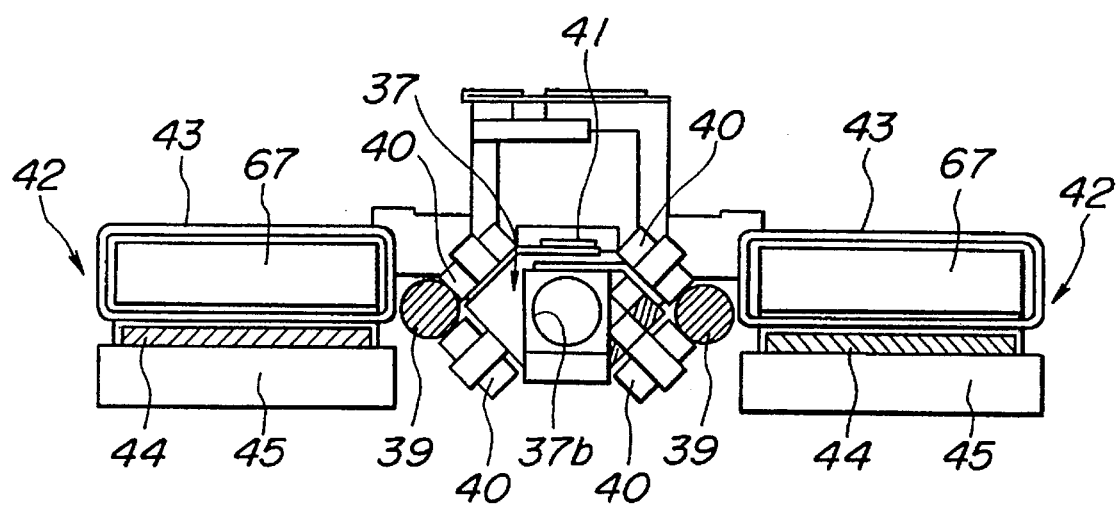
FIG. 11 is a sectional view taken along the line XI—XI of FIG. 9.

As best shown in FIG. 9, the carriage 37 is slidably supported on guide rails 39 which are disposed on the chassis 1 at the rear of the spindle motor 10 and extend rearward in parallel and spaced relation. The carriage 37 is radially movable with respect to the photomagnetic disc 202, as seen in FIG. 9. The carriage 37 is provided with two pairs of bearings 40 at one side thereof and with one pair of bearings 40 at the other side thereof. As shown in FIG. 11, each pair of bearings 40 have rotation axes which are inclined at an angle of about ninety degrees relative to each other. An elastic member 41 is secured to the carriage 37 to bias one of each pair off bearings 40 in such a direction that an angle between the rotation axes is smaller than ninety degrees.

As shown in FIG. 9, a pair of linear motors 42 driving the carriage 37 on the guide rails 39 are disposed on both sides of the carriage 37. Each of the linear motors 42 includes a coil 43 wound on a center yoke 67, a lower yoke 45 opposed to the center yoke 67, and a magnet 44 interposed between the center yoke 67 and the lower yoke 45.

As seen in FIG. 9, the carriage 37 supports thereon a lens holder 47. As best shown in FIG. 10, the lens holder 47 includes an upper elastic plate 48 with the objective lens 12, a lower elastic plate 48 opposed to the upper elastic plate 48, and a motor 49 driving the lens holder 47 for focusing. The motor 49 includes a pair of coils 50 disposed on both sides of the elastic plates 48 in opposed relation to the objective lens 12, center yokes 51, magnets 52 opposed the center yokes 51 via the coils 50, and side yokes 53 opposed to the magnets 52.

Figure 12:
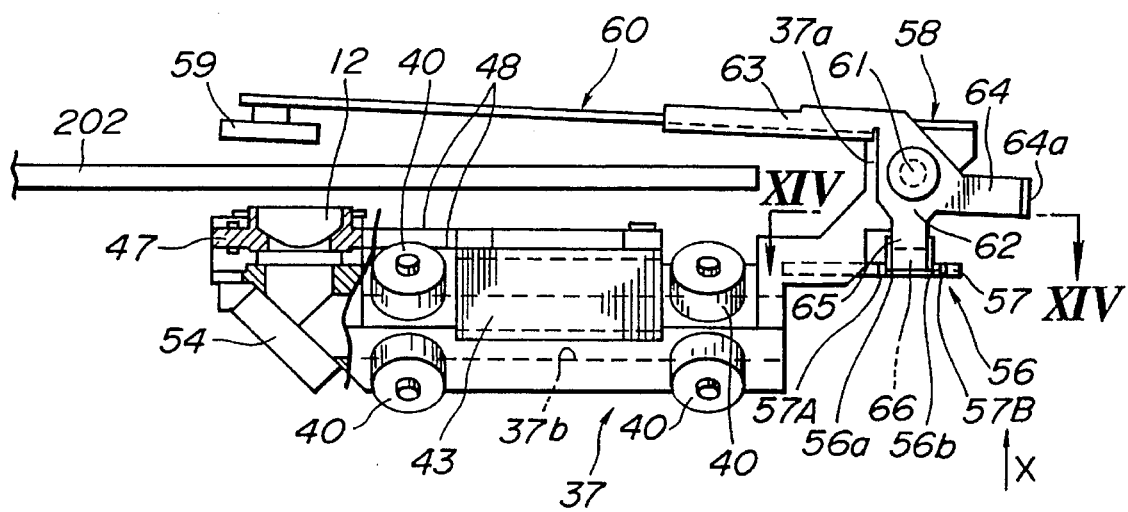
FIG. 12 is a side view of a head supporting mechanism, showing a magnetic head placed remote from the photomagnetic disc.
Figure 13:
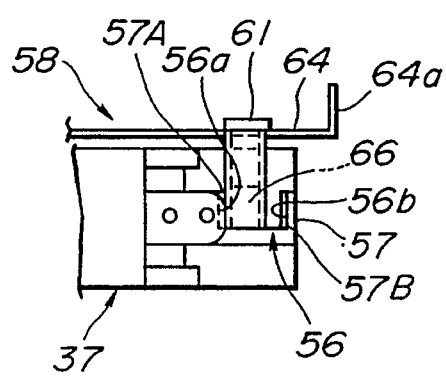
FIG. 13 is a fragmentary bottom view of a retaining mechanism for retaining the head supporting mechanism, as viewed from a direction as indicated by the arrow X of FIG. 12.
Figure 14:
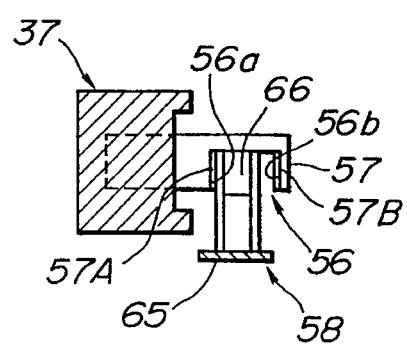
FIG. 14 is a sectional view of the retaining mechanism taken along the line XIV—XIV of FIG. 12.

The carriage 37 is formed with a beam passage 37b as shown in FIG. 12, through which light beam emitted from the fixed optical device 35 passes. A mirror 54 is disposed below the objective lens 12 to reflect the light beam which passes through the beam passage 37b and transmitted to the objective lens 12.

Figure 15:
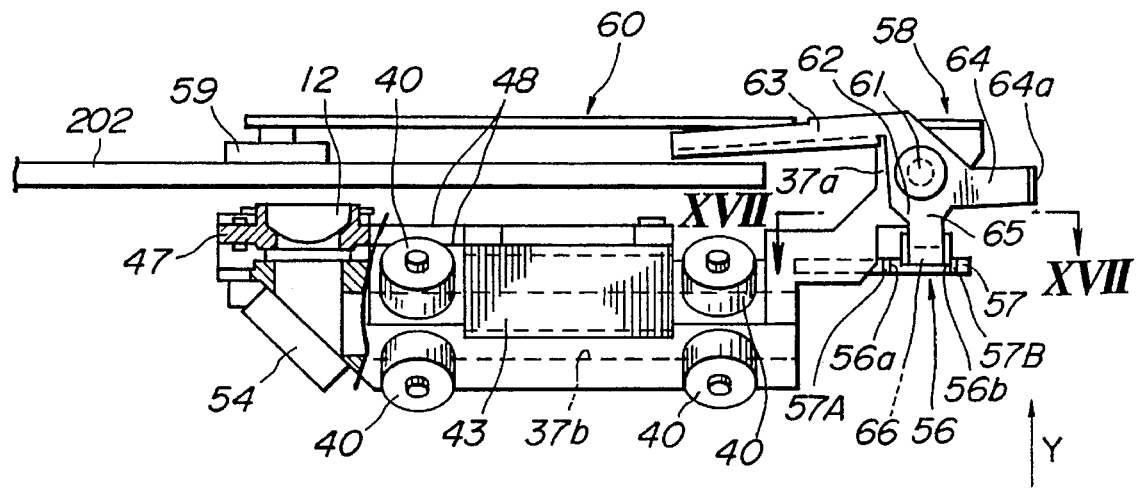
FIG. 15 is a side view of the head supporting mechanism, showing the magnetic head placed on the photomagnetic disc.
Figure 16:
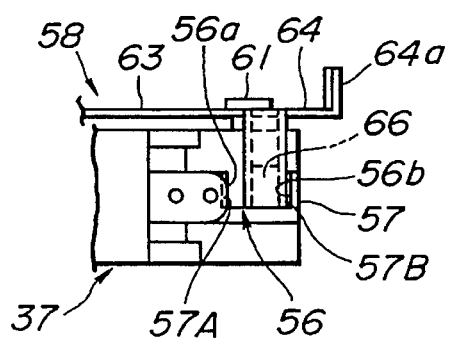
FIG. 16 is a fragmentary bottom view of the retaining mechanism as viewed from a direction as indicated by the arrow Y of FIG. 15.
Figure 17:
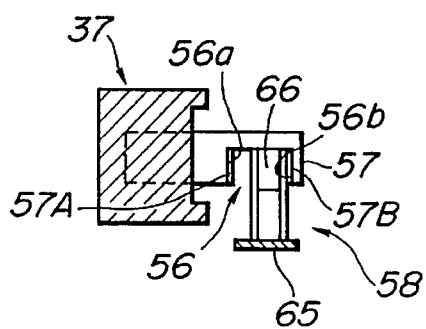
FIG. 17 is a sectional view of the retaining mechanism taken along the line XVII—XVII of FIG. 15.

Referring back to FIG. 5, disposed at the rear of the carriage 37 is a head supporting mechanism for supporting a magnetic head 59 which produces magnetic field. The magnetic field is applied to a signal storage face of the photomagnetic disc 202 on which information signals are stored. The head supporting mechanism has a loading position as shown in FIG. 15, where the magnetic head 59 is disposed in contact with the signal storage face of the photomagnetic disc 202 to apply magnetic field thereto, and an unloading position as shown in FIG. 12, where the magnetic head 59 is disposed remote from the signal storage face of the photomagnetic disc 202 to be prevented from applying magnetic field thereto.

As best shown in FIG. 9, the head supporting mechanism includes a supporting plate 57 secured to the rear end of the carriage 37, a lifter 58 pivotally disposed on the carriage 37, and a head arm 60 which is pivotally disposed on the lifter 58 and supports the magnetic head 59.

The lifter 58 is pivotally supported on an upright portion 37a of the carriage 37 around a pin 61, as best shown in FIG. 12. The lifter 58 is formed with a base 62 provided with the pin 61. A generally U-shaped arm support 63 extends forward from the base 62 and supports the head arm 60 on a supporting face 63a as seen in FIG. 9. A generally L-shaped lever portion 64 extends rearward from the base 62 and is bent rightward as viewed in FIG. 9, so as to be integrally formed with a tab portion 64a.

The head arm 60 supporting the magnetic head 59 is of a flying type in which the head arm 60 made of a sheet member is flexed to move upward as viewed in FIG. 12, remote from the signal storage face of the photomagnetic disc 202 due to air flow caused by rotation of the photomagnetic disc 202. The head arm 60 fails to be flexed when the head supporting mechanism is placed at the unloading position as shown in FIG. 12. The head arm 60 is allowed to be flexed such that the magnetic head 59 is urged against the signal storage face by application of a pressure between a few grams and ten grams when the head supporting mechanism is placed at the loading position as shown in FIG. 15.

Referring to FIGS. 9 and 12-14, a retaining mechanism for retaining the head supporting mechanism at the loading and unloading positions.

As seen in FIGS. 9, 12-14, and 15-17, the supporting plate 57 of a generally rectangular shape is formed with a cutout 56 at one side thereof. A pair of magnetic chips 57A and 57B made of a magnetic material are disposed on opposed peripheral edges of the cutout 56. A magnet 66 is disposed on a magnet support 65 extending downward from the base 62 of the lifter 58, in opposed relation to the magnetic chips 57A and 57B, as best shown in FIG. 12. By the pivotal motion of the lifter 58, the magnet support 65 moves between two positions as seen in FIGS. 12-14 and FIGS. 15-17 by attractive contact of the magnet 66 with the magnetic chips 57A and 57B. Thus, the lifter 58 is allowed to be retained at the respective positions.

Referring to FIGS. 5, 18, 19, 20-22, a locking mechanism for locking the head supporting mechanism now will be explained. The locking mechanism is shiftable between a locking position where the locking mechanism engages the head supporting mechanism to prohibit the movement of the head supporting mechanism into the loading position and a release position where the locking mechanism disengages the head supporting mechanism to allow the movement of the head supporting mechanism into the loading position.

Figure 19:
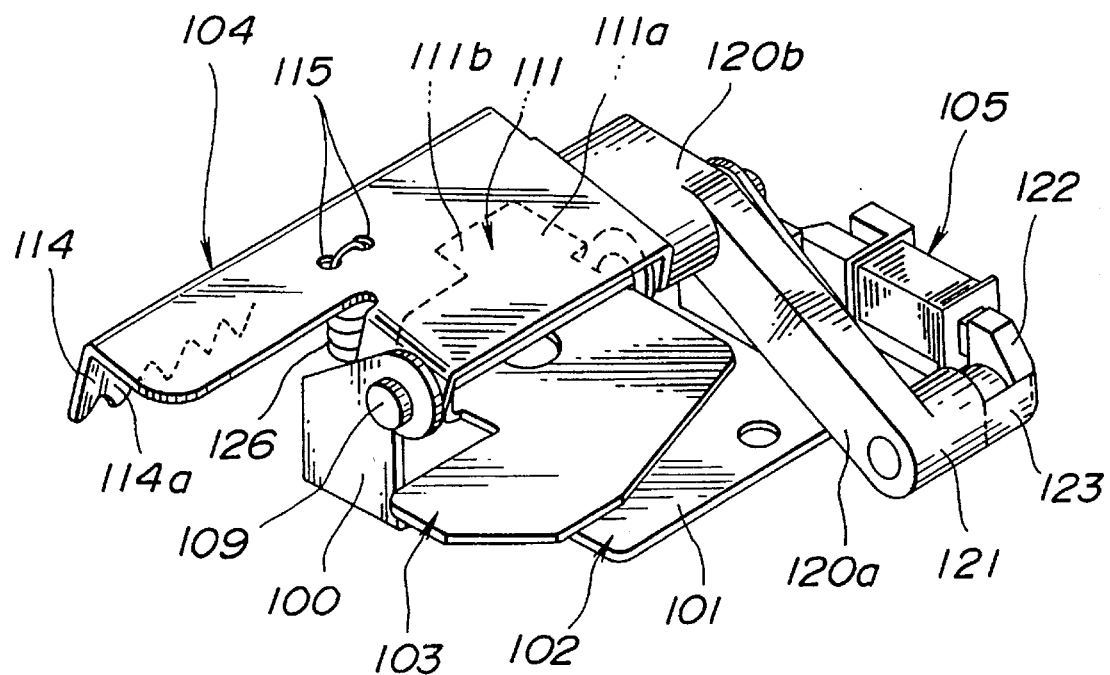
FIG. 19 is an enlarged view of the locking mechanism of FIG. 18.

As best shown in FIG. 19, the locking mechanism includes a base 102, first and second locking plates 103 and 104 which are pivotally supported on the base 102, respectively, and a solenoid operated clutch 105 serving for retaining the second locking plate 104 at a predetermined pivotal position.

Figure 21:
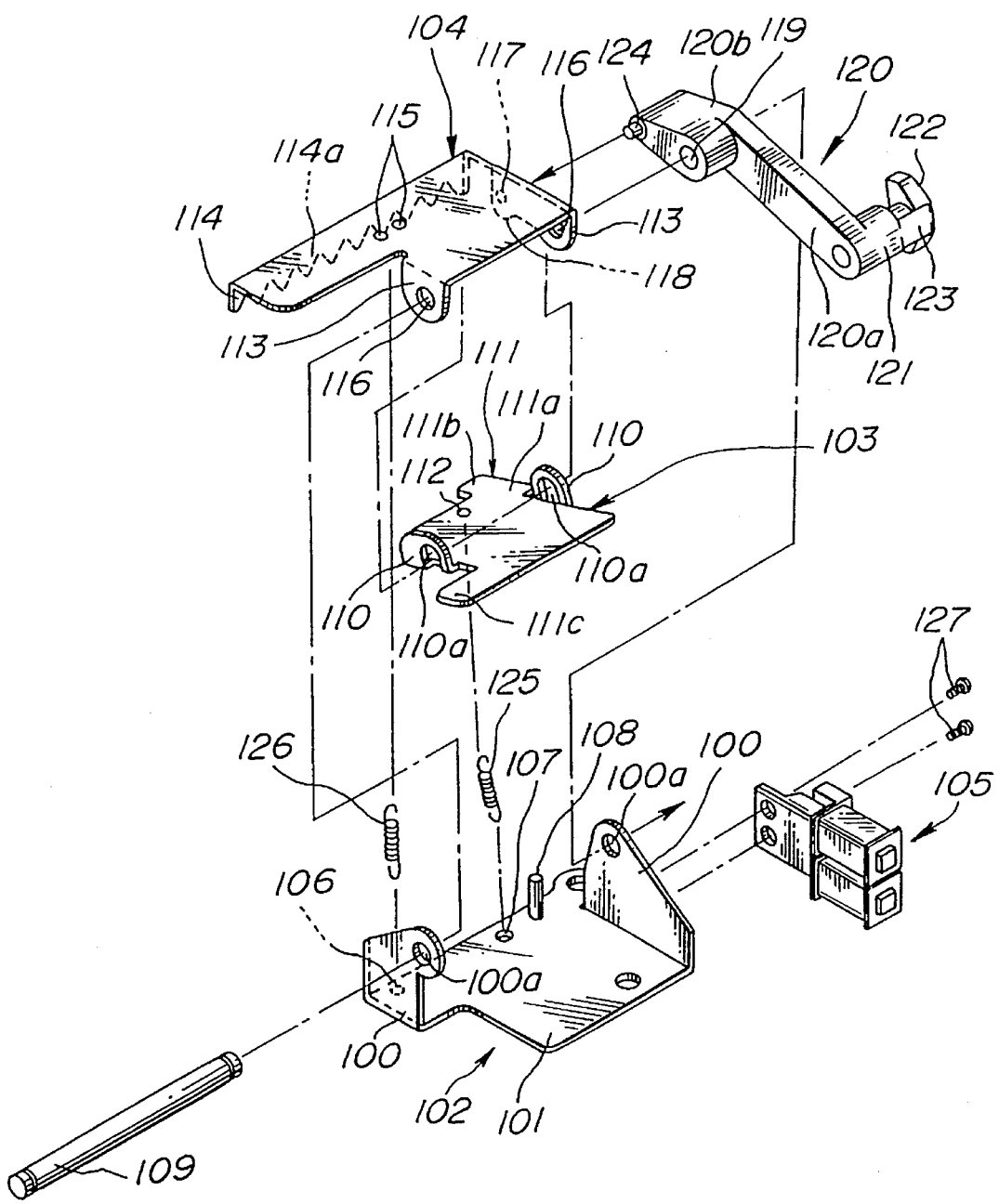
FIG. 21 is an exploded view of the locking mechanism.

The base 102 includes a bottom wall 101, and spaced front and rear walls 100 extending upward as viewed in FIG. 21, from the bottom wall 101. The bottom wall 101 is formed with a hole 106 in which one end of a coil spring 126 is engaged and a hole 107 in which one end of a coil spring 125 is engaged. A stop 108 is disposed near the hole 107 and extends therefrom upward as viewed in FIG. 21. The front and rear walls 100 are formed with opposed openings 100a through which a pivot shaft 109 extends in parallel with a direction of the advancing or entreating motion of the carriage 37 relative to the photomagnetic disc 202. The opposed openings 100a are positioned at a greater height level than a distal end of the stop 108.

As seen in FIG. 21, the first locking plate 103 is formed with a generally rectangular shaped body and opposed upright walls 110 extending uprightly from the body. The upright walls 110 each have openings 110a through which the pivot shaft 109 extends. The first locking plate 103 also is integrally formed with an urging tab 111 at a rear corner thereof, as seen in FIG. 21. The urging tab 111 includes a plate urging portion 111a extending rearward from a rear end of the body and a lifter urging portion 111b which extends outward from a side edge of the body and joins the plate urging portion 111a. The lifter urging portion 111b is engageable with the lever portion 64 of the lifter 58 upon pivoting of the first locking plate 103. As seen in FIG. 21, a hole 112 is formed on the body in opposed relation to the hole 107 of the base 102 so as to engage the other end of the coil spring 125. Thus, the coil spring 125 is disposed between the base 102 and the first locking plate 103 to bias the first locking plate 103 in such a direction that the urging tab 111 urges against the stop 108.

The second locking plate 104 includes a generally rectangular shaped top wall and opposed side walls 113 extending downward as viewed in FIG. 21, from the front and rear edges off the top wall. The side walls 113 are respectively interposed between the front and rear walls 100 of the base 102 and the upright walls 110 of the first locking plate 103, upon mounting. The side walls 113 are formed with openings 116 through which the pivot shaft 109 extends. Thus, the first and second locking plates 103 and 104 are pivotally supported around the pivot shaft 109 on the base 102. A rear one of the side walls 113 is integrally formed with a protrudent portion 118 which is opposed to the plate urging portion 111a of the first locking plate 103 to be engageable therewith upon pivoting of the First locking plate 103.

The second locking plate 104 includes a gear section 114 extending downward as viewed in FIG. 21, from a side edge of the top wall. The gear section 114 is formed with a plurality of teeth 114a which are disposed within a range corresponding to that of the advancing or retreating motion of the carriage 37 relative to the photomagnetic disc 202. The teeth 114a are engageable with the tab portion 64a of the lever portion 64 of the lifter 58. As shown in FIG. 21, two holes 115 are formed on the top wall in opposed relation to the hole 106 of the base 102 so as to engage the other end of the coil spring 126. The coil spring 126 is interposed between the base 102 and the second locking plate 104 to bias the second locking plate 104 in such a direction that the teeth 114a engage the tab portion 64a of the lever portion 64 of the lifter 58.

Figure 20:
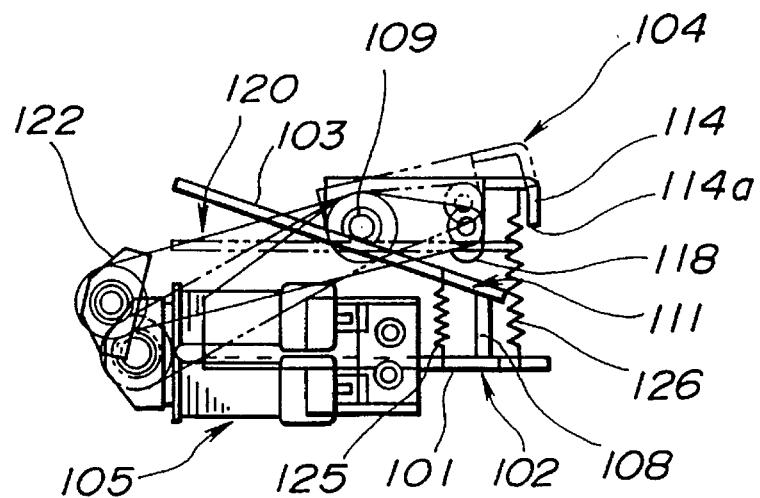
FIG. 20 is a side view of the locking mechanism.

As shown in FIGS. 19 and 21, a generally L-shaped rotating arm 120 is rotatably coupled with the rear side wall 113 of the second locking plate 104. The L-shaped rotating arm 120 has one end portion 120b, the other end portion 121 and a bar-shaped portion 120a interposed therebetween. The one end portion 120b is formed with a recess 119 in which one end of the pivot shaft 109 projecting from the opening 116 of the rear side wall 13 is pivotally received. The one end portion 120b also is formed with a pin 124 fitted into a hole 117 which is disposed on the protrudent portion 118 of the rear side wall 113 of he second locking plate 104. A magnetic block 122 made of a magnetic material is rotatably disposed on the other end portion 21. The magnetic block 122 is attracted by the solenoid operated clutch 105 and abuts against a stop 123 which is disposed on the other end portion 121, at a predetermined rotating angle during rotation. The solenoid operated clutch 105 is secured to the rear wall 100 of the base 102 by means of screws 127. As shown in FIG. 20, the solenoid operated clutch 105 is so designed as to be de-energized to attract the magnetic block 122 when the gear section 114 of the second locking plate 104 is placed at its upper-most position as indicated in a phantom line, and energized to release the magnetic block 122 when the gear section 114 is placed at its lower-most position as indicated in a solid line.

Figure 23:
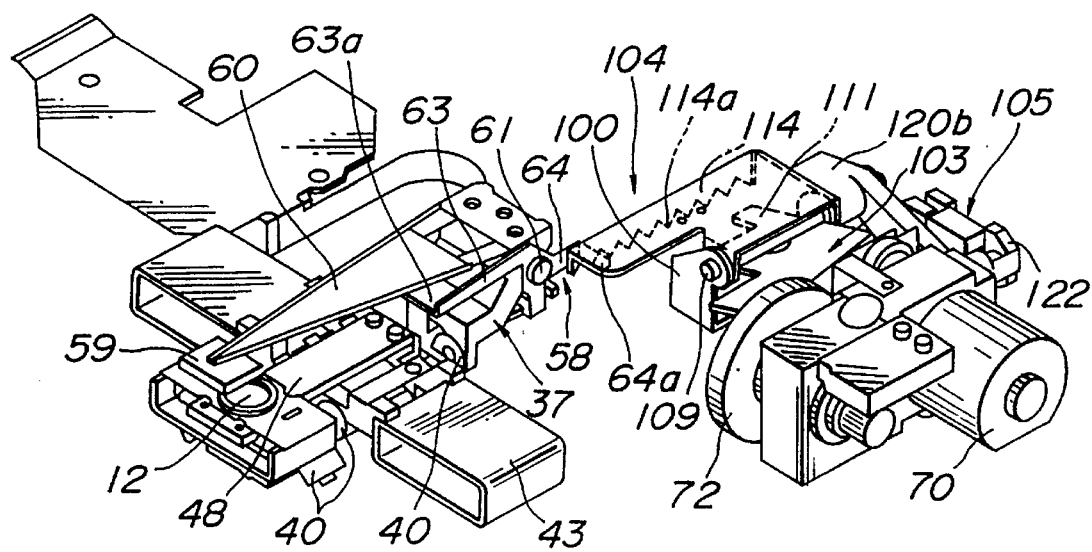
FIG. 23 is a perspective view showing the locking mechanism placed at a locking position.
Figure 24:
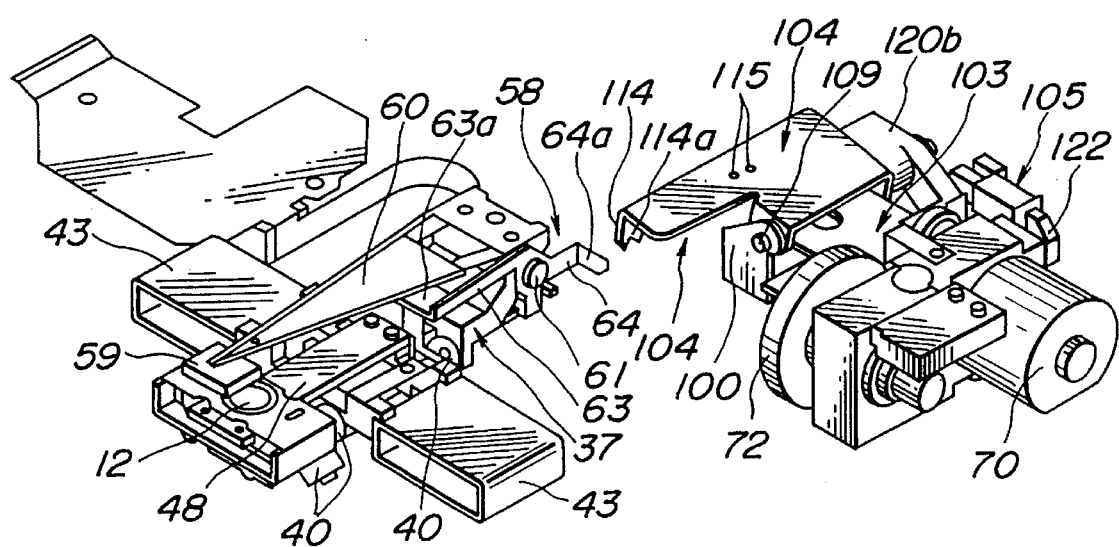
FIG. 24 is a perspective view showing the locking mechanism placed at a release position.

Thus, the locking mechanism has the locking position as shown in FIG. 23, where one of the teeth 114a of the gear section 114 placed at the lower-most position engages the tab portion 64a of the lever portion 64 of the lifter 58, and the release position as shown in FIG. 24, where the teeth 114a of the gear section 114 placed at the upper-most position disengage from the tab portion 64a of the lifter 58.

Figure 18:
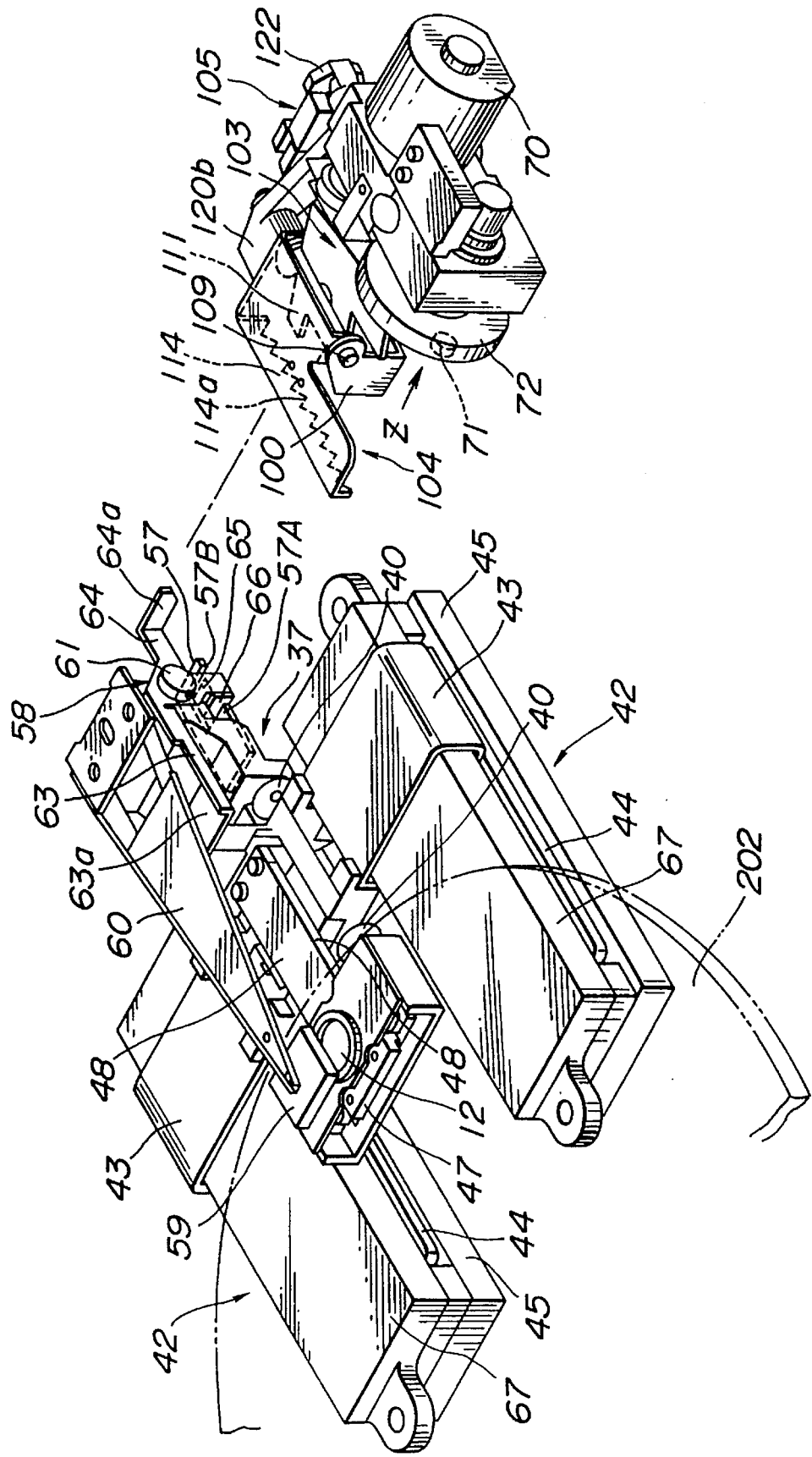
FIG. 18 is a perspective view showing the optional pickup mechanism, the head supporting mechanism and a locking mechanism for locking the head supporting mechanism.
Figure 22:
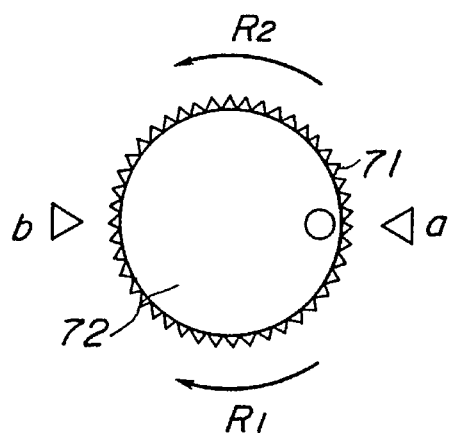
FIG. 22 is a front view of a transmission gear as viewed From a direction as indicated by the arrow Z of FIG. 18.

Disposed adjacent the locking mechanism is a driving mechanism for driving the locking mechanism. As shown in FIG. 18, the driving mechanism includes a motor 70 and a transmission gear 72 connected with the motor 70. The transmission gear 72 is formed with a pin 71 engageable with an urging tab 111c which extends forward from a front end of the First locking plate 108 as shown in FIG. 21. The motor 70 is so constructed as to be energized upon shifting of the locking mechanism. By energization of the motor 70, the transmission gear 72 rotates in directions as indicated by the arrows R1 and R2 of FIG. 22. Upon rotation of the transmission gear 72 in the directions R1 and R2, the pin 71 moves from an initial position "a" to a shift position "b" and vice versa which are disposed around the gear 72 as seen in FIG. 22. Upon moving from the initial position "a" to the shift position "b" by rotating the gear 72 in the direction R1, the pin 71 rearward urges the engaging tab 83 of the slide plate 75 such that the slide plate 75 is moved from a forward position where the disc cartridge 201 is in the loading position, to a rearward position where the disc cartridge 201 is in the unloading position. Upon moving from the initial position "a" to the shift position "b" by rotating the gear 72 in the direction R2, the pin 71 urges the urging tab 111c of the first locking plate 103 downward as viewed in FIG. 20. Then, the second locking plate 104 is moved into the upper-most position.

Referring to FIGS. 25–28, a manner of the shutter opening operation will now be described.

Figure 26:
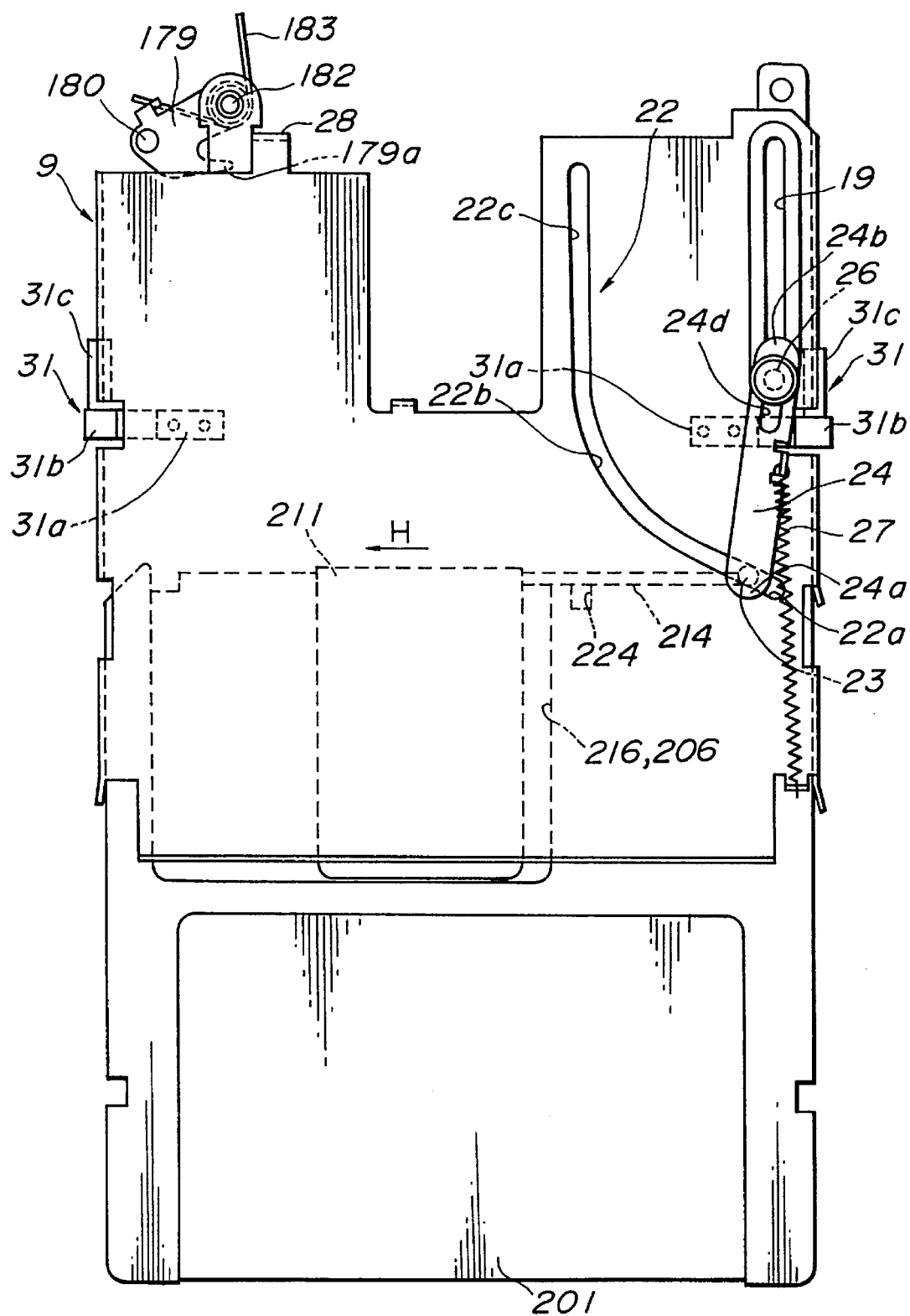

As shown in FIG. 25, when the disc cartridge 201 is inserted into the cartridge holder 9 via the opening 18 in a direction as indicated by the arrow D, the shutter opening pin 23 contacts the end face 209 of the disc cartridge 201. When the disc cartridge 201 is moved toward the rear end of the cartridge holder 9, the shutter opening pin 23 is urged against the connecting portion 214 of the shutter 211. Then, the link 24 pivots clockwise around the guide pin 26 against biasing force of the coil spring 27, as shown in FIG. 26. The shutter opening pin 23 moves from the diagonal portion 22a of the second cam groove 22 toward the arcuate portion 22b. The shutter 211 is allowed to move in a direction by the arrow H of FIG. 26, and starts to open the first and second openings 216 and 206 of the upper and lower halves 204 and 205 of the disc cartridge 201.

Figure 27:
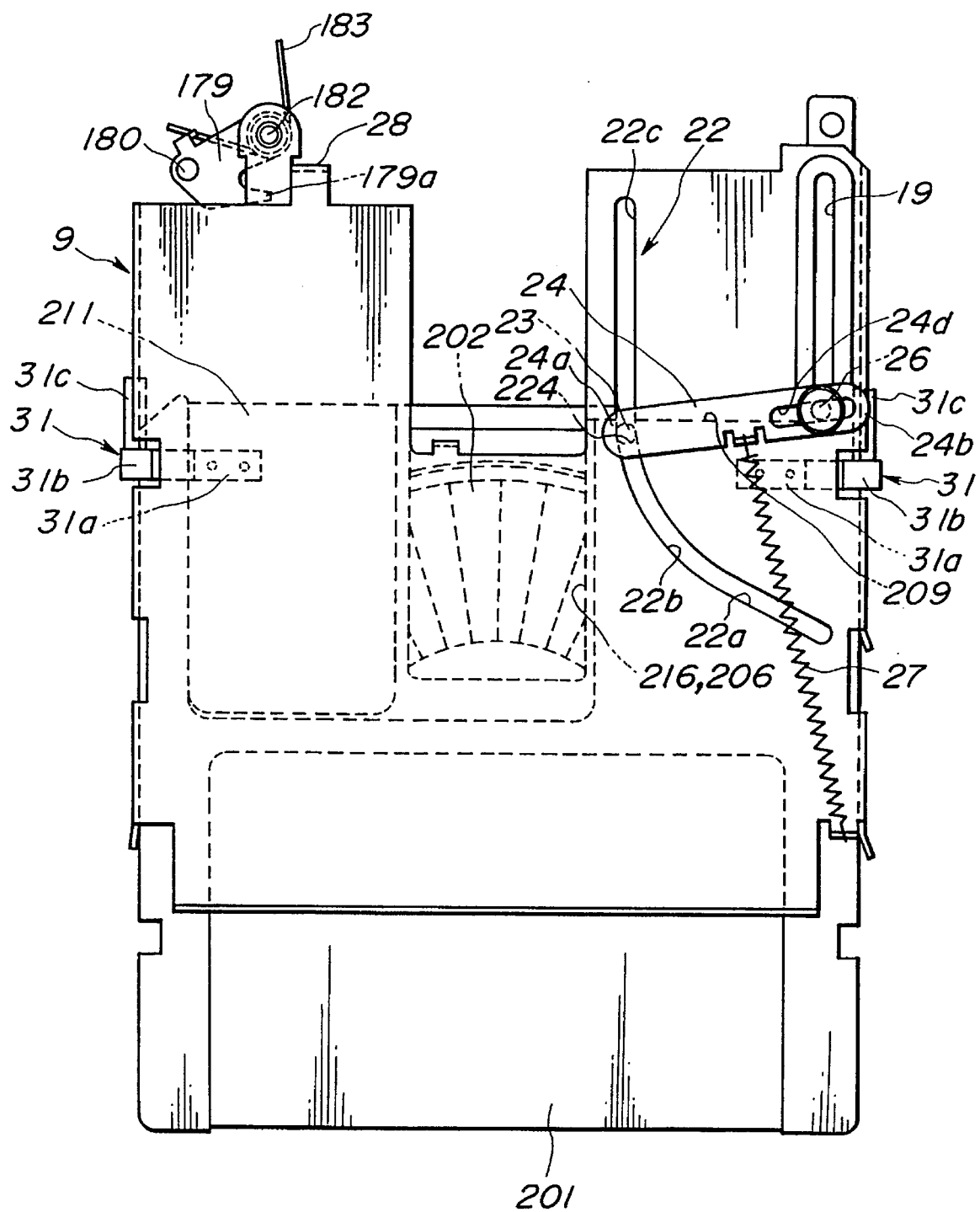

When the disc cartridge 201 is further moved rearward in the cartridge holder 9, the shutter opening pin 23 still urges the shutter 211 and moves along the end face 209 of the disc cartridge 201 to be engaged with the groove 224 as seen in FIG. 27. Simultaneously, the shutter opening pin 23 moves on the arcuate portion 22b toward the straight portion 22c of the second cam groove 22 by the clockwise pivotal motion of the link 24 around the guide pin 26. Thus, the shutter 211 is allowed to much open the first and second openings 216 and 206.

Figure 28:
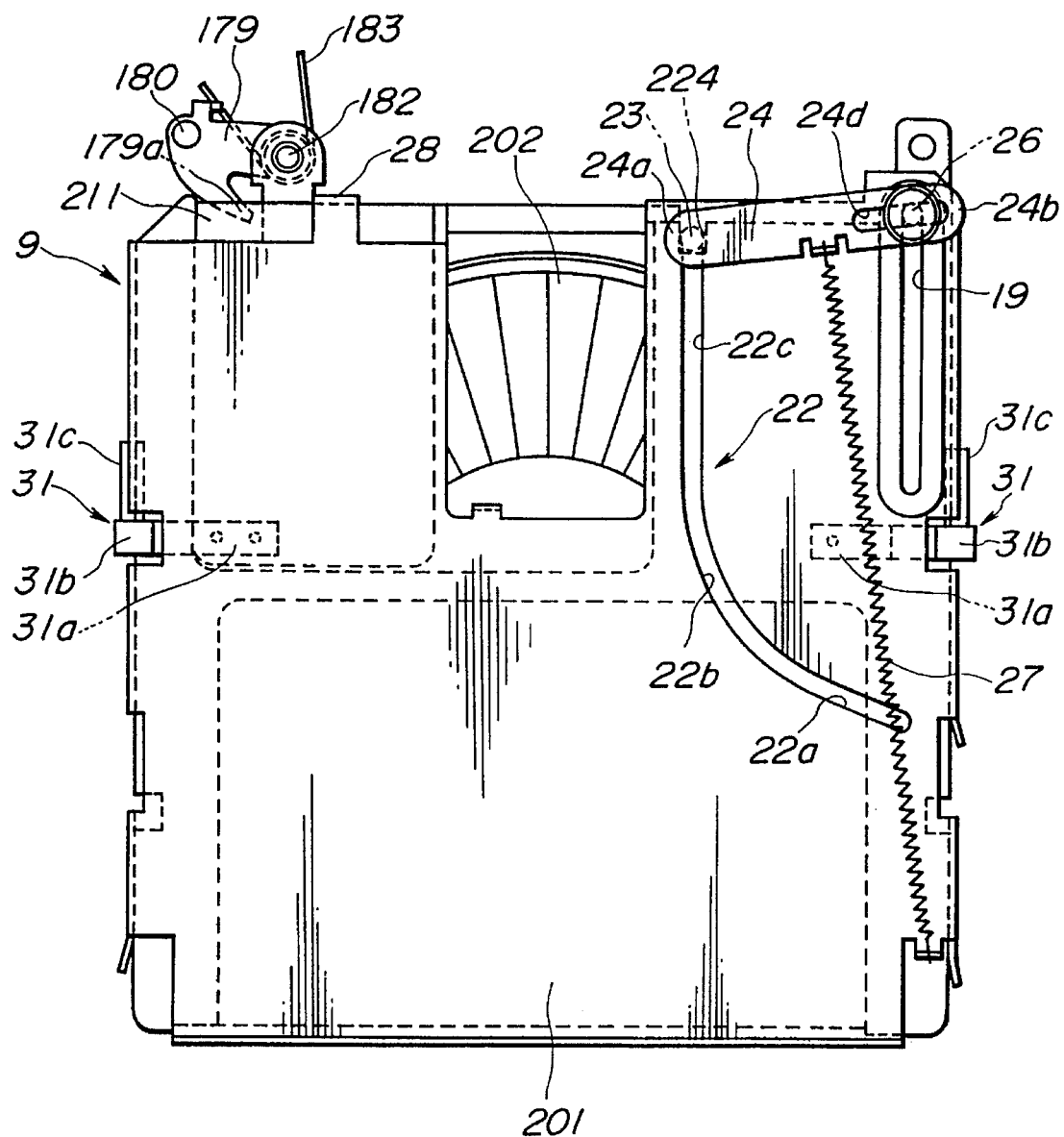

When the disc cartridge 201 is moved to be placed in the loading position as shown in FIG. 28, the clockwise pivotal motion of the link 24 causes the shutter opening pin 23 to reach a distal end of the straight portion 22c of the second cam groove 22 while keeping engaged with the groove 224 of the disc cartridge 201. During the movement of the shutter opening pin 23, the guide pin 26 rearward moves on the first cam groove 19 and abuts on a distal end thereof. The shutter 211 fully opens first and second openings 216 and 206 of the disc cartridge 201 to expose a portion of the photomagnetic disc 202 therefrom.

Referring to FIGS. 29–36, a manner of the disc injecting operation will now be explained.

As shown in FIGS. 29 and 31, when the disc cartridge 201 is inserted into the cartridge holder 9, the shutter 211 of the disc cartridge 201 engages the shutter contact portion 178 of the first injection plate 170. Then, the first injection plate 170 moves in a direction as indicated by the arrow I of FIG. 29 in the cartridge holder 9. The second injection plate 171 pivots around the axis 184 in a direction as indicated by the arrow J of FIG. 29 during the movement of the first injection plate 170. The pivotal motion of the second injection plate 171 causes the cartridge holding pin 185 to move toward the groove 228 of the disc cartridge 201. In this condition, the pin 189 of the third injection plate 172 engages the injection plate retaining portion 75b of the slide plate 75. The trigger arm rotating portion 181 of the first injection plate 170 contacts and urges the trigger arm pin 180 of the trigger arm 179 in the direction I of FIG. 29. The trigger arm 179 pivots around the axis 182 in a direction as indicated by the arrow K of FIG. 29 and the latch 179a of the trigger arm 179 disengages the slide plate engaging pin 75a. Thus, the slide plate 75 is allowed to move on the chassis 1 in a direction as indicated by the arrow L of FIG. 29, by a biasing force of the coil spring 191 supported by the guide pin 76 and the spring mount tab 84.

Figure 33:
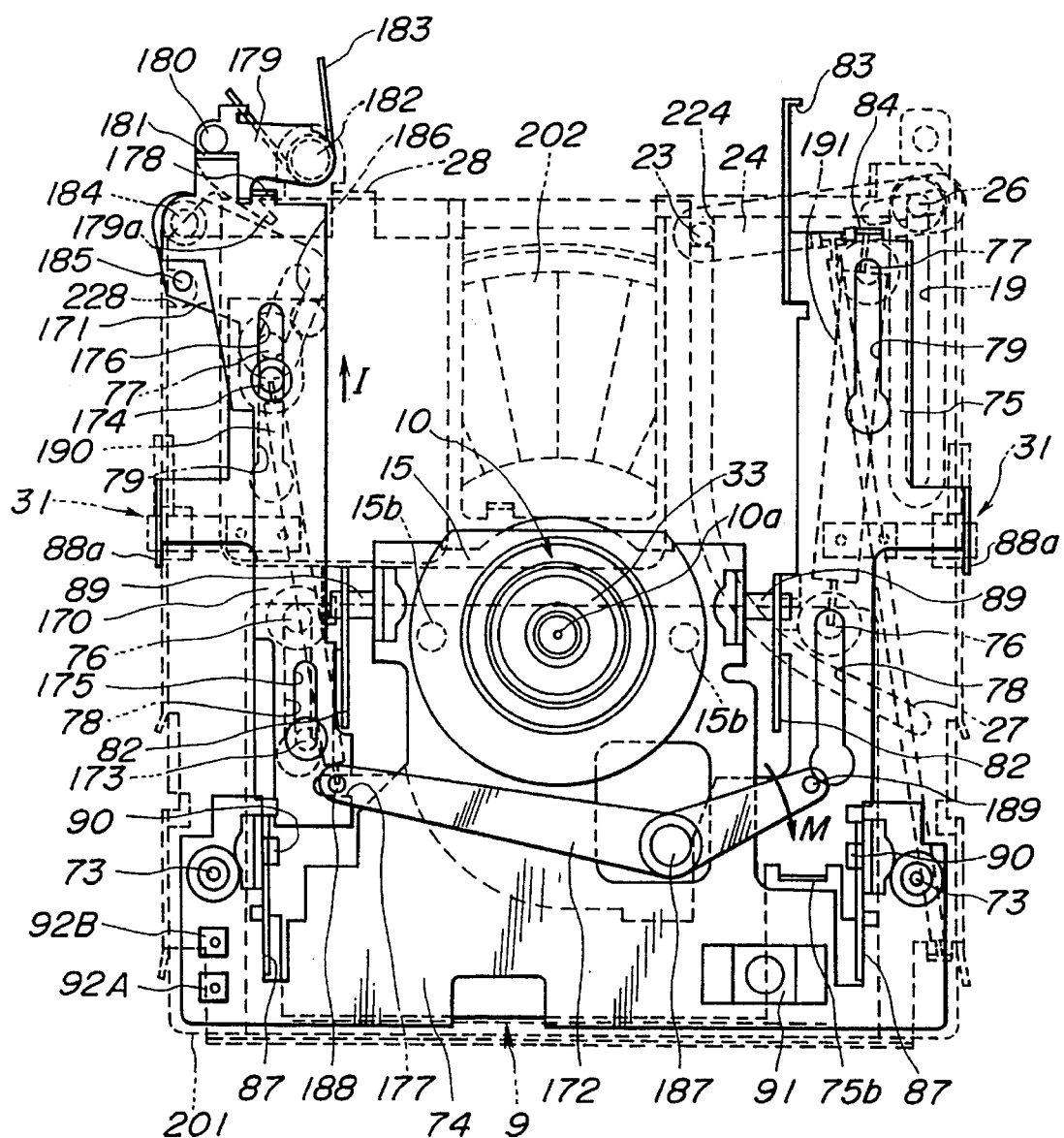
FIG. 33 is a plan view showing the disc cartridge loaded in the cartridge holder.

The movement L of the slide plate 75 in the direction L as indicated in FIG. 29 causes disengagement of the pin 189 of the third injection plate 172 from the injection plate retaining portion 75b, as seen in FIG. 33. Then, the third injection plate 172 is pivoted round the axis 187 in a direction as indicated by the arrow M of FIG. 33 by a biasing force of the coil spring 190. By the pivotal motion of the third injection plate 172, the connecting pin 188 urges the first injection plate 170 in the direction I as indicated in FIG. 33. The cartridge holding pin 185 is allowed to be received in the groove 228 of the disc cartridge 201. Thus, the disc cartridge 201 is placed at the predetermined position as seen in FIG. 33, in the cartridge holder 9. At this position, the shutter 211 of the disc cartridge 201 engages the stop 28 of the cartridge holder 9.

Figure 34:
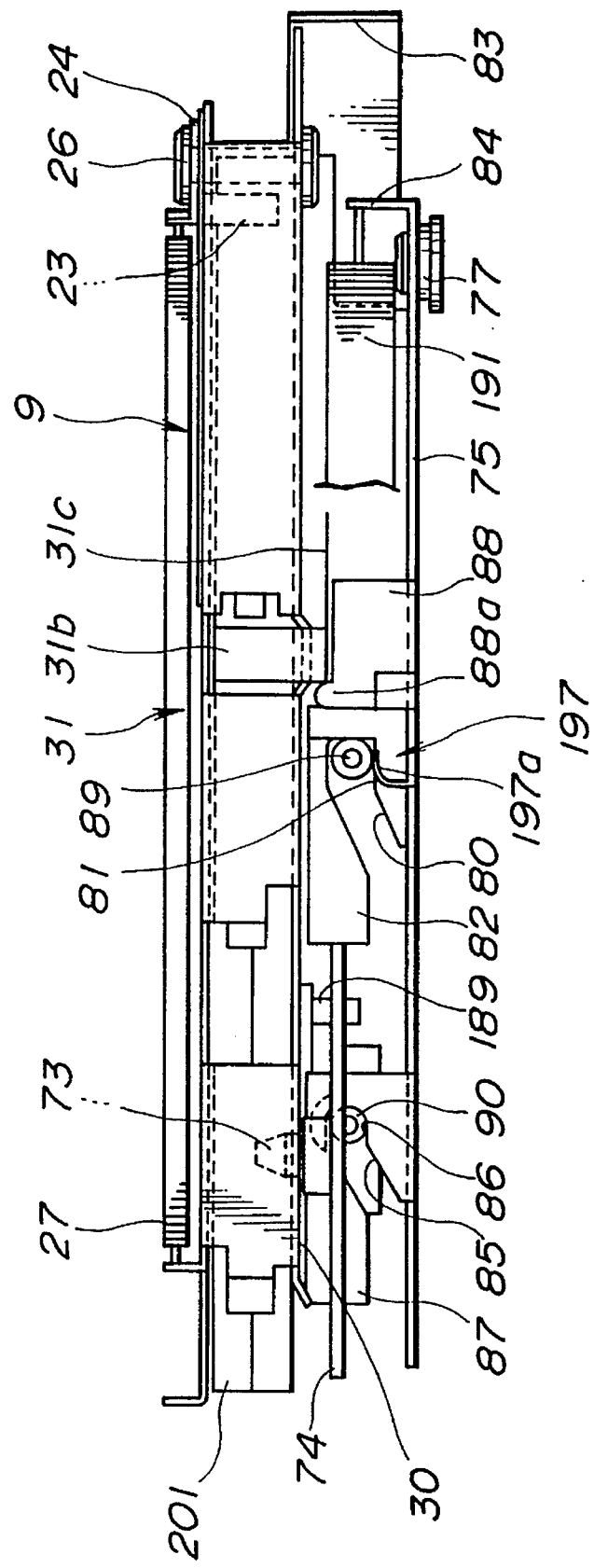
FIG. 34 is a right side view of FIG. 33.
Figure 35:
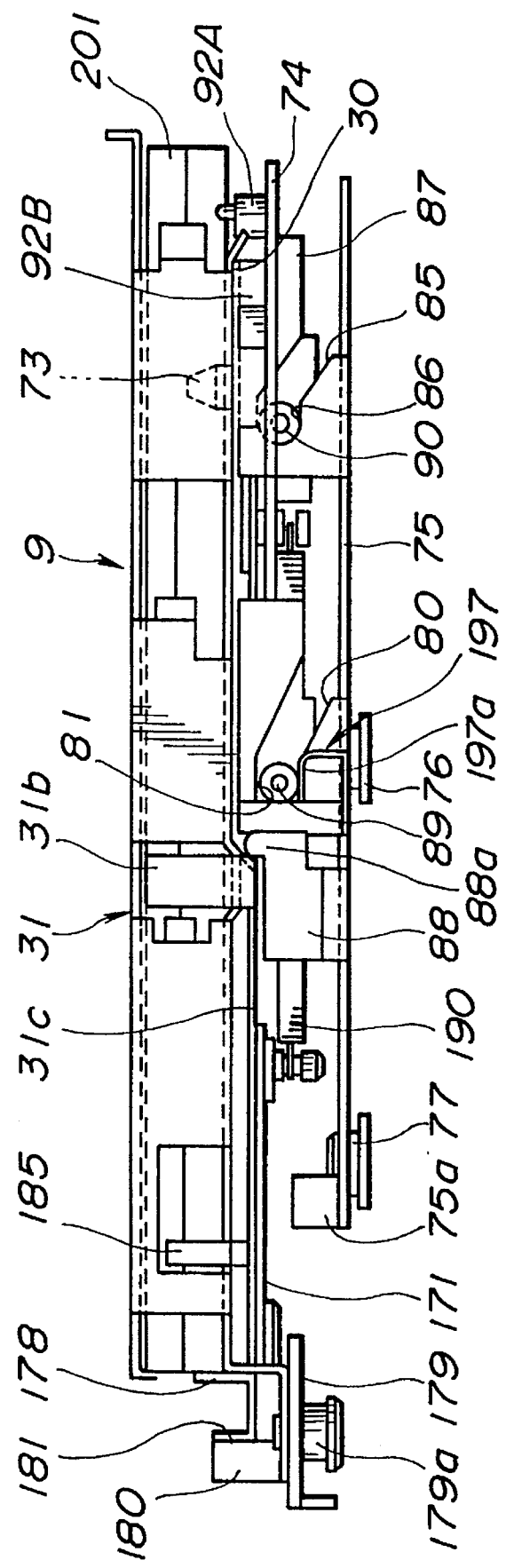
FIG. 35 is a left side view of FIG. 33.
Figure 36:
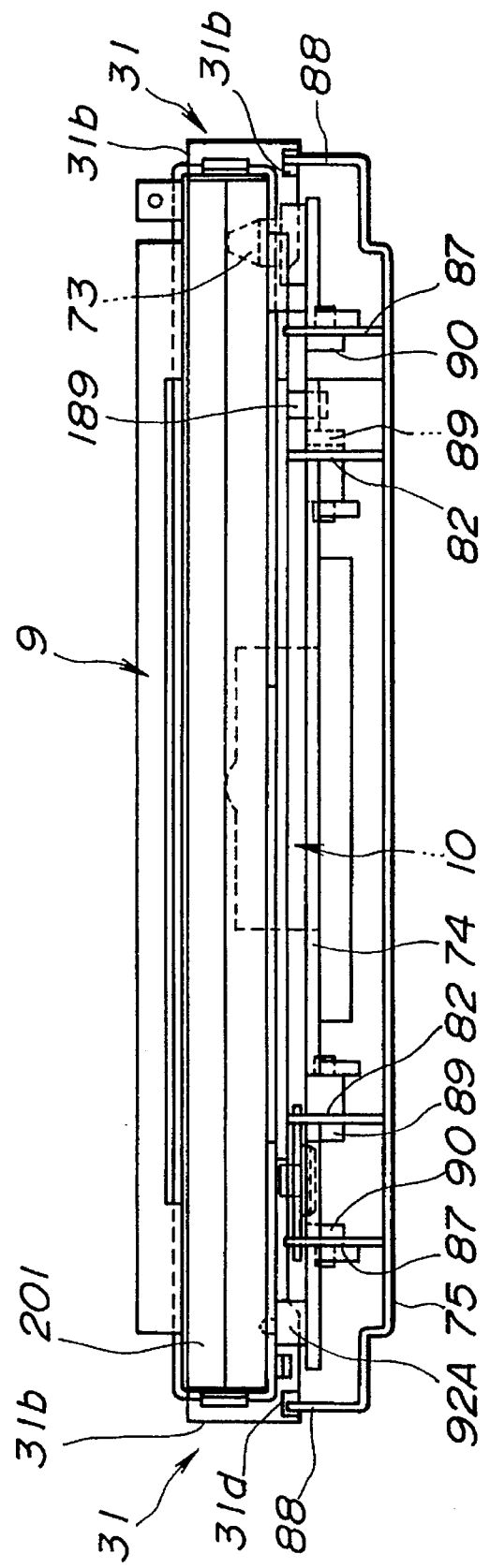
FIG. 36 is a front elevation of FIG. 33.

When the slide plate 75 moves in the direction L as indicated in FIG. 29, the protrudent portions 88a of the urging tabs 88 of the slide plate 75 are disengaged from the stopper portions 312c of the cartridge urging members 31 as seen in FIGS. 34 and 35. The cartridge contact portions 31b contact and urge the upper end face of the disc cartridge 201 downward as viewed in FIGS. 34 and 35. Thus, the disc cartridge 201 is urged against the cartridge supporting sections 30 of the cartridge holder 9 and held at a predetermined height level in the chassis 1.

Simultaneously, during the movement of the slide plate 75 in the direction L in FIG. 29, the first and second pins 89 and 90 move upward as viewed in FIG. 34, on the cam grooves of the first and second brackets 82 and 87, respectively. The second pins 90 reach the upper end of the cam groove of the second brackets 87 faster than the first pins 89 do, because of the larger angle of the diagonal portions 85 of the cam grooves of the second brackets 87. Accordingly, the front portion of the elevating plate 74 moves upward in advance of the elevating motion of the rear portion thereof. Thus, the cartridge positioning pins 73 on the front portion are received in the holes 225 and 226 of the lower half 205 of the disc cartridge 201 so that the disc cartridge 201 is positioned at the predetermined height level on the elevating plate 74. Subsequently, the spindle motor 10 on the rear portion moves upward until the elevating plate 74 contacts the motor positioning member 15, and is retained at the upper-most position by a biasing force of the spring members 97 of the slide plate 75. Then, the spindle shaft 10a of the spindle motor 10 is engaged with the chucking hub 202a of the photomagnetic disc 202.

Thus, the photomagnetic disc 202 is placed in the loading position in the recording/reproducing apparatus.

Operations off loading and unloading the magnetic head 59 with respect to the photomagnetic disc 202 will now be described.

Upon the loading operation, the solenoid operated clutch 105 is energized so as to release the magnetic block 122. The second locking plate 104 is pivoted clockwise on the pivot shaft 109 by a downward biasing force of the coil spring 126 as seen in FIG. 20. As shown in FIG. 23, one of the teeth 114a of the gear section 114 of the second locking plate 104 is engaged with the tab portion 64a of the lever portion 64 of the lifter 58 and urged thereagainst. The lifter 58 is rotated clockwise as viewed in FIG. 12, by the urging force of the gear section 114 against the tab portion 64a, so that the magnetic head 59 is disposed remote from the photomagnetic disc 202. The magnetic head 59 is retained in the remote position by attractive engagement of the magnet 66 of the lifter 58 with the magnetic chip 57A disposed at the rear end of the carriage 37.

Subsequently, the motor 70 is energized to rotate the transmission gear 72 in the direction R2 until the pin 71 moves from the position "a" into the position "b" as seen in FIG. 22. By the rotation of the transmission gear 72, the pin 71 urges the first locking plate 103 counterclockwise against a biasing force of the coil spring 125 as seen in FIG. 20. The pivotal motion of the first locking plate 103 allows the second locking plate 104 to rotate counterclockwise against the biasing force of the coil spring 126. The rotating arm 120 rotates together with the second locking plate 104 such that the magnetic block 122 is attracted by the solenoid operated clutch 105 de-energized. In this condition, the teeth 114a of the gear section 114 is disengaged from the tab portion 64a of the lever portion 64 of the lifter 58, as shown in FIG. 24.

The transmission gear 72 is rotated by the motor 70 in the direction R1 until the pin 71 moves into the position "a", as seen in FIG. 22, and then the transmission gear 72 is stopped. The first locking plate 103 is released from the urging Force of the pin 71 and rotates clockwise to abut on the stop 108 of the base 102 as indicated by the solid line of FIG. 20.

The disc type detecting switch 92B on the elevating plate 74 detects whether the photomagnetic disc 202 is of ROM type or RAN type. If the photomagnetic disc 202 is detected as the ROM type, the carriage 37 moves close to the photomagnetic disc 202 in the radial direction of the photomagnetic disc 202 and the spindle motor 10 rotates. Then, reading sequence starts after focusing, in which the magnetic head 59 is not operated. In a case where the photomagnetic disc 202 is detected as the RAM type, the loading operation of the magnetic head 59 starts as follows.

First, the linear motor 42 is actuated to move the carriage 37 close to an outer-most peripheral portion of the photomagnetic disc 202 which is placed on the disc table 34. In this case, the tab portion 64a of the lever portion 64 of the lifter 58 is placed above the lifter urging portion 111b of the urging tab 111 of the first locking plate 103.

Subsequently, the motor 70 is energized to drive the transmission gear 72 in the direction R2 until the pin 71 moves from the position "a" the position "b", as shown in FIG. 22. The rotation of the transmission rear 72 causes the pin 71 to urge the first locking plate 103 counterclockwise against the biasing force of the coil spring 125 as seen in FIG. 20. The lifter urging portion 111b of the first locking plate 103 urges the lever portion 64 of the lifter 58. As shown in FIG. 15, the lifter 58 rotates around the pin 61 counterclockwise such that the magnetic head 59 on the head arm 60 is contacted with the photomagnetic disc 202. The lifter 58 further rotates counterclockwise until the head arm 60 is disposed remote from the supporting face 63a of the arm support 63. The magnetic head 59 is kept in contact with the photomagnetic disc 202 by the attractive engagement between the magnet 66 and the magnetic chip 57B, as seen in FIG. 15. Thus, the magnetic head 59 is loaded on the photomagnetic disc 202.

Subsequently, the motor 70 rotates in a reverse direction such that the pin 71 of the transmission gear 72 moves into the position "a" in the direction R1 of FIG. 22. Then, the motor 70 stops its rotation. During such a movement of the pin 71, the first locking plate 103 is rotated clockwise in FIG. 20 by the biasing force of the coil spring 125 and abuts against the stop 108.

Thus, the loading operation of the magnetic head 59 is performed. After that, the carriage 37 moves in the radial direction of the photomagnetic disc 202 and reading/writing sequence after focusing operation starts.

The unloading operation of the magnetic head 59 will now be explained.

The spindle motor 10 is stopped and the solenoid operated clutch 105 is actuated to release the magnetic block 122. The rotating arm 120 rotates clockwise in FIG. 20 together with the second locking plate 104, by the biasing force of the coil spring 126. The rotation of the second locking place 104 allows the teeth 114a of the gear section 114 to engage the tab portion 64a of the lever portion 64. The lifter 58 rotates clockwise to move into the position as shown in FIG. 12, and is retained there by the attractive engagement of the magnet 66 with the magnetic chip 57A. At this position, the magnetic head 59 disposed on the supporting face 63a of the arm support 63 is placed remote from the photomagnetic disc 202.

Then, the motor 70 drives the transmission gear 72 in the direction R1 until the pin 71 moves from the position "a" into the position "b", as seen in FIG. 22. During the movement of the pin 71, the pin 71 urges the engaging tab 83 of the slide plate 75 rearward as viewed in FIG. 5. The slide plate 75 is moved rearward against the biasing force of the return coil spring 191 and the elevating plate 74 moves downward as viewed in FIG. 5, on the cam groove of the first and second 82 and 87. The photomagnetic disc 202 is placed in the unloading position.

The disc ejecting operation will start subsequent to the unloading operation of the magnetic head 59. Owing to the downward motion of the elevating plate 74, the cartridge positioning pins 73 is removed from the holes 225 and 226 of the disc cartridge 201 and the spindle shaft 10a of the spindle motor 10 is disengaged from the chucking hub 202a.

Simultaneously, as seen in FIGS. 30 and 31, due to the rearward motion of the slide plate 75, the protrudent portions 88a of the urging tabs 88 of the slide plate 75 are engaged with the stopper portions 31c and the cartridge contact portions 31b is disengaged from the upper end face of the disc cartridge 201.

The further rearward motion of the slide plate 75 causes the injection plate retaining portion 75b to engage the pin 189 of the third injection plate 172 as seen in FIG. 29. Then, the third injection plate 172 pivots around the axis 187 in a direction reverse to the direction M of FIG. 33, against the biasing force of the coil spring 190. By the pivotal motion of the third injection plate 172, the first injection plate 170 moves in a direction reverse to the direction I of FIG. 33, namely, toward the opening 18 of the cartridge holder 9.

Owing to the forward movement of the first injection plate 170, the second injection plate 171 pivots around the axis 184 in a direction reverse to the direction J of FIG. 29. The cartridge holding pin 185 is moved out of the grooves 228 of the disc cartridge 201 so that the disc cartridge 201 is allowed to eject from the cartridge holder 9. The trigger arm 179 pivots around the axis 182 in a direction reverse to the direction K of FIG. 29 incidentally to the forward movement of the first injection plate 170. The latch 179 is engaged with the slide plate engaging pin 75a.

Then, the disc cartridge 201 is allowed to move toward the outside of the cartridge holder 9 by the coil spring 27. As shown in FIGS. 28, 27, 27 and 25, the link 24 pivots counterclockwise around the guide pin 26 and the shutter opening pin 23 moves from the straight portion 22c via the arcuate portion 22b to the diagonal portion 22a of the second cam groove 22. Simultaneously, the shutter opening pin 23 moves out of the groove 224 of the disc cartridge 201 and advances on the end face 209 to the right end of the end face 209, as seen in FIG. 25. During this movement of the shutter opening pin 23, the shutter 211 moves in a direction reverse to the direction H of FIG. 26, to cover the openings 216 and 206 of the disc cartridge 201. Thus, as shown in FIG. 25, a front end portion of the front the disc cartridge 201 is ejected from the cartridge holder 9. Then, the disc cartridge 201 is removed via the inlet/outlet opening 5 from the recording/reproducing apparatus.

Figure 37:
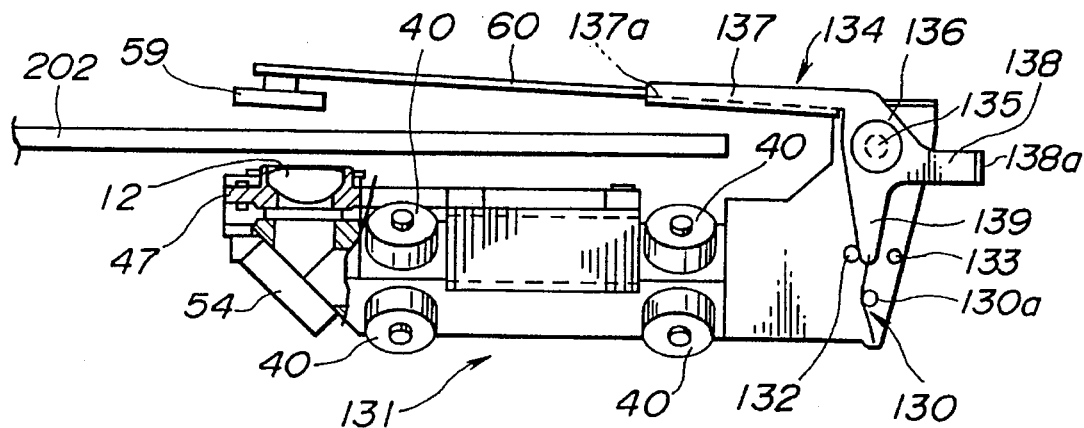
FIGS. 37–39 are side views of a second embodiment of the retaining mechanism, showing the retaining operation during loading and unloading of the magnetic head.
Figure 38:
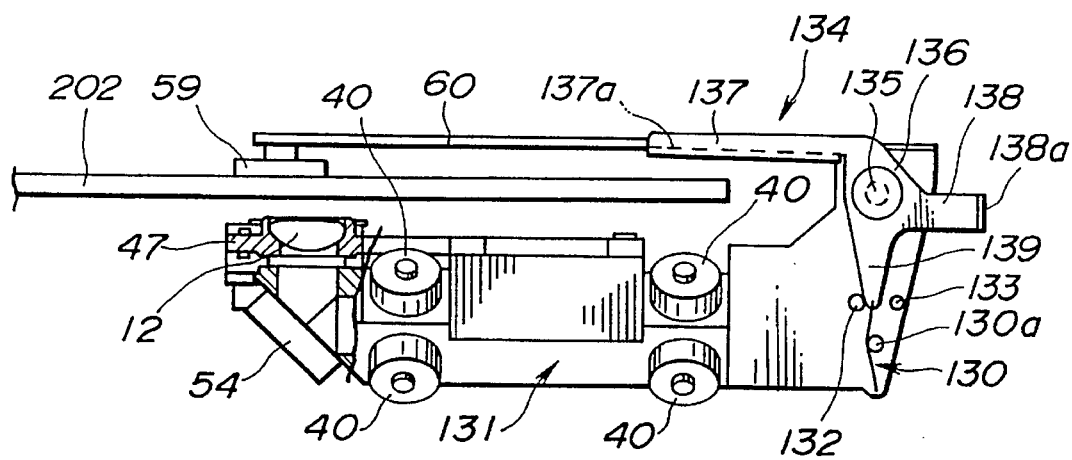
Figure 39:
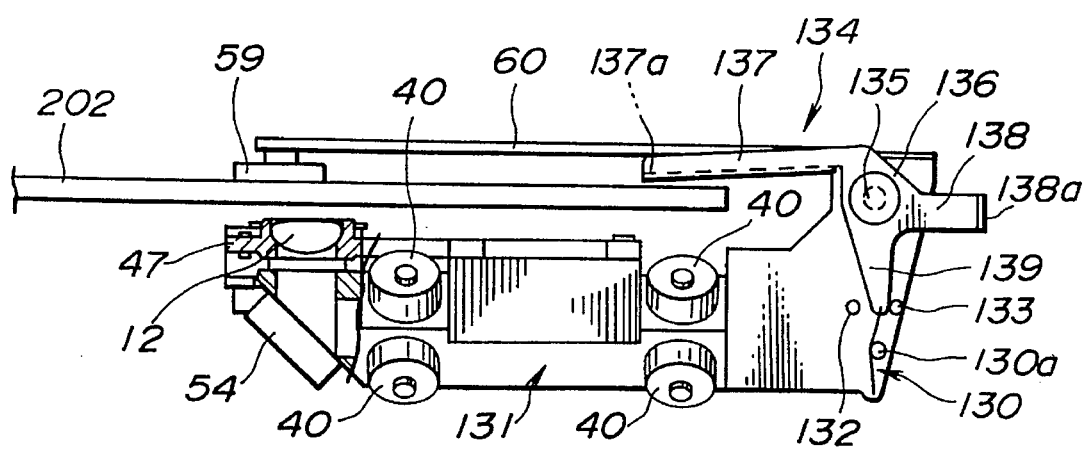

Referring to FIGS. 37–39, there is shown another embodiment of the retaining mechanism used in the recording/reproducing apparatus according to the present invention, which is similar to the first embodiment except a spring support 130a and a pair of stop pins 132 and 133 which are disposed on a carriage 131, a pin urging portion 139 disposed on a lifter 134, and a return spring 130 wound on the spring support 130a. Like numerals denote like parts of the first embodiment and therefore the detailed descriptions thereabout are omitted.

As shown in FIG. 37, the carriage 131 includes a rear portion formed with the spring support 130a. The lifter 134 is pivotally disposed around a pin 135 which is disposed on the rear portion of the carriage 131. As shown in FIG. 37, the lifter 134 is formed with a base 136 supported by the pin 135, an arm support 137 extending forward from the base 136, and a lever portion 138 extending rearward from the base 136. The arm support 137 is of a generally U shape of a sectional view and has a supporting face 137a supporting the head arm 60 thereon. The lever portion 138 of a generally L shape is integrally formed with a tab portion 138a, as seen in FIG. 37. The tab portion 138a is engageable with the second locking plate 104 of the locking mechanism as similar to the tab portion 64a of the lifter 58 of the first embodiment. The pin urging portion 139 extends downward as viewed in FIG. 37, from the base 136 and is moved between the stop pins 132 and 133 during the pivotal motion of the lifter 134. As seen in FIG. 37, the return spring 130 has one end supported at a lower end of the rear portion of the carriage 131 and the other end supported at the pin urging portion 139 of the lifter 134.

As shown in FIG. 37, the pin urging portion 139 is urged on the stop pin 132 against a biasing force of the return spring 130. In this position, the magnetic head 59 is disposed remote From the photomagnetic disc 202. As shown in FIG 38, the pin urging portion 139 is still urged on the stop pin 132. In this position, the magnetic head 59 is placed on the photomagnetic disc 202. As seen in FIG. 39, the pin urging portion 139 is urged on the stop pin 133 by the biasing force of the return spring 130. In such a position, the magnetic head 59 is kept in contact with the photomagnetic disc 202.

Figure 40:
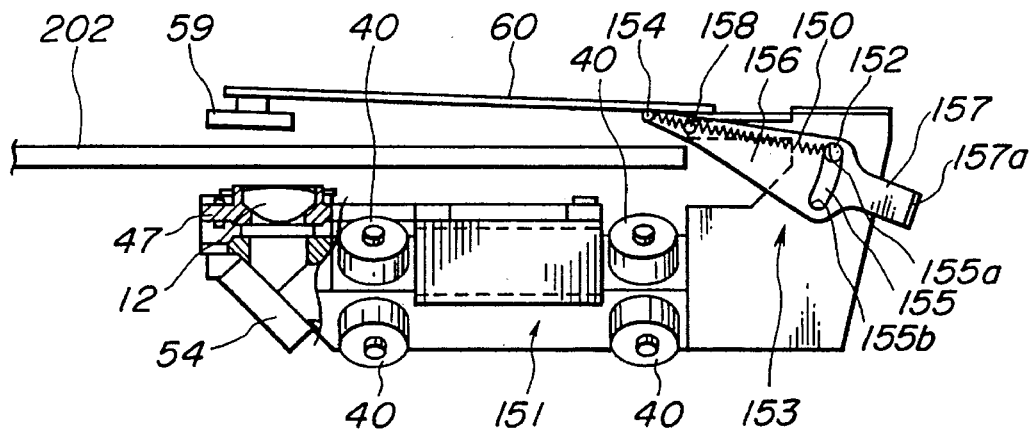
FIGS. 40–42 are side views of a third embodiment of the retaining mechanism, showing the retaining operation during loading and unloading of the magnetic head.
Figure 41:
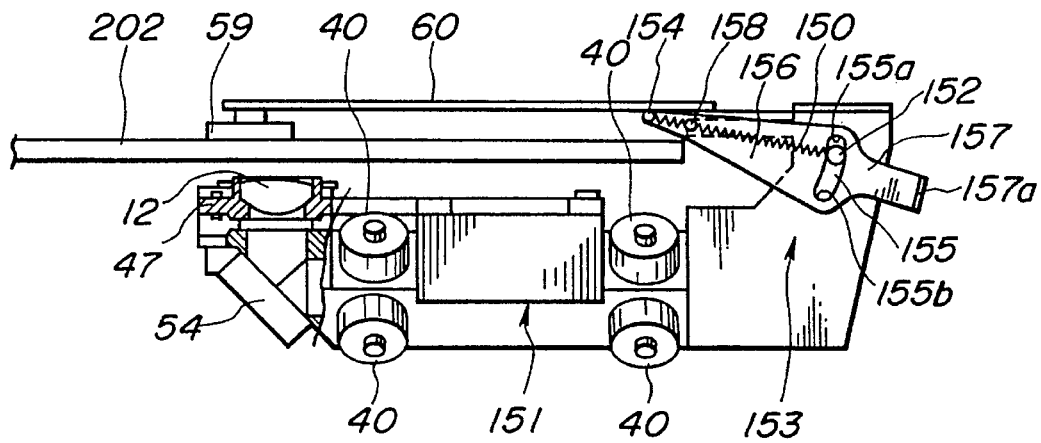
Figure 42:
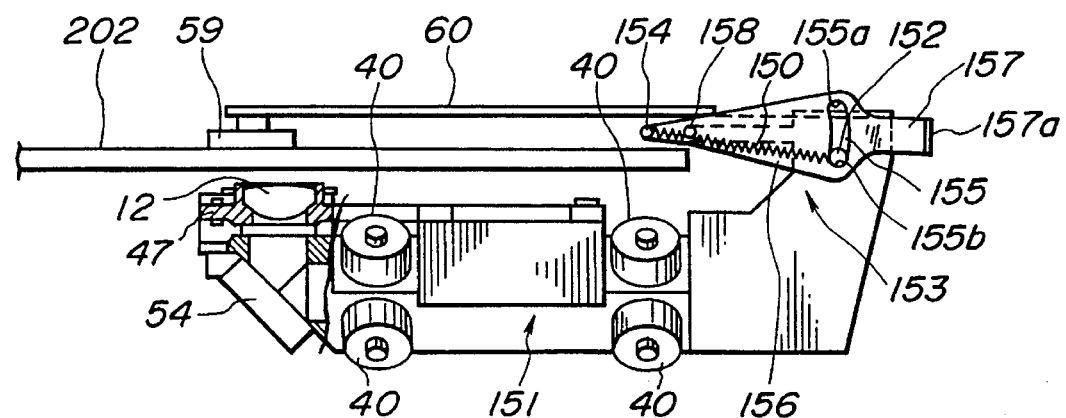

Referring to FIGS. 40–42, there is shown still another embodiment of the retaining mechanism used in the recording/reproducing apparatus according to the present invention, which is similar to the first embodiment except a stop pin 152 disposed on a carriage 151, a cam groove 155 and a spring support 154 which are formed on a lifter 153, and a coil spring 150 connected with the stop pin 152 and the spring support 154 at its opposed ends. Like numerals denote like parts of the first embodiment and therefore the detailed descriptions thereabout are omitted.

As shown in FIG. 40, the carriage 151 includes a rear portion formed with the stop pin 152. The lifter 153 is pivotally supported around a pin 158 disposed on the rear portion of the carriage 151. The lifter 153 includes an arm support 156 of a generally sectorial shape on which the cam groove 155 is so disposed as to be engageable with the stop pin 152. The spring support 154 is disposed on a forward distal end of the arm support 156 of the lifter 153, as seen in FIG. 40. As shown in FIG. 40, a lever portion 157 extends rearward from the arm support 156. The lever portion 157 is of a generally L shape of a plan view and integrally formed with a tab portion 157a. The tab portion 157a is engageable with the second locking plate 104 of the locking mechanism as similar to the tab portion 64a of the lifter 58 of the fist embodiment.

The lifter 153 is pivotally movable around the pin 58 into positions as shown in FIGS. 40–42. As shown in FIG. 40, the lifter 153 is placed in a lower-most position where one end 153a of the cam groove 155 engages the stop pin 152. In this position, the tab portion 157a of the lifter 153 is engaged with the second locking plate 104 and the magnetic head 59 is disposed remote from the photomagnetic disc 202. As seen in FIG. 41, the lifter 153 is placed in an intermediate position where the one end 155a and the other end 155b of the cam groove 155 are disengaged from the stop pin 152. In this position, the tab portion 157a of the lifter 153 is disengaged from the second locking plate 104 and the magnetic head 59 is placed on the photomagnetic disc 202. As shown in FIG. 42, the lifter 153 is pivotally moved into an upper-most position where the other end 155b of the cam groove 155 engages the stop pin 152. In such a position, the tab portion 157a of the lifter 153 is still disengaged from the second locking plate 104 and the magnetic head 59 is kept in contact with the photomagnetic disc 202.

As is apparently appreciated from the aforementioned description, a photomagnetic disc recording/reproducing apparatus according to the present invention is improved in reducing electric consumption and serves for preventing any trouble or damage caused by emergent power down.

Further, it is appreciated that the photomagnetic disc recording/reproducing apparatus of the invention has such a simple structure that a common driving source is utilized for loading and unloading operations of the magnetic head and insertion and removal operations of the photomagnetic disc.

What is claimed is:

1. An apparatus for recording and reproducing information stored on a photomagnetic disc, comprising:

a carriage carrying an objective lens and radially movable with respect to the photomagnetic disc;

a head support disposed on said carriage, said head support holding a magnetic head which applies magnetic field to the photomagnetic disc;

means for moving said head support between a loading position where said head support is placed close to the photomagnetic disc such that said magnetic head applies the magnetic field to the photomagnetic disc, and an unloading position where said head support is placed remote from the photomagnetic disc such that said magnetic head is prevented from applying the magnetic field to the photomagnetic disc;

means for retaining said head support at said loading position when said head support is moved to said loading position, and at said unloading position when said head support is moved to said unloading position, said retaining means being disposed on said carriage; and said retaining means including a magnet disposed on said head support and a pair of opposed members made of magnetic material disposed on said carriage, one of said opposed members being selectively attracted by said magnet depending upon whether said head support is placed at said loading position or at said unloading position.

2. An apparatus for recording and reproducing information stored on a photomagnetic disc, comprising:

a carriage carrying an objective lens and radially movable with respect to the photomagnetic disc;

a head support disposed on said carriage, said head support holding a magnetic head which applies magnetic field to the photomagnetic disc, said head support including an arm supporting said magnetic head and a lifter rotatably supporting said arm;

means for moving said head support between a loading position where said head support is placed close to the photomagnetic disc such that said magnetic head applies the magnetic field to the photomagnetic disc, and an unloading position where said head support is placed remote from the photomagnetic disc such that said magnetic head is prevented from applying the magnetic field to the photomagnetic disc, said moving means being engageable with said lifter;

means for retaining said head support at said loading position when said head support is moved to said loading position, and at said unloading position when said head support is moved to said unloading position, said retaining means being disposed on said carriage;

said retaining means including a torsion spring having one end fixed to said lifter and the other end fixed to said carriage; and a pair of stops disposed on said carriage, said torsion spring selectively biasing said lifter against one of said stops, said stops engage said lifter to restrict movement of said lifter.

3. An apparatus for recording and reproducing information stored on a photomagnetic disc, comprising:

a carriage carrying an objective lens and radially movable with respect to the photomagnetic disc;

a head support disposed on said carriage, said head support holding a magnetic head which applies magnetic field to the photomagnetic disc, said head support including an arm supporting said magnetic head and a lifter rotatably supporting said arm;

means for moving said head support between a loading position where said head support is placed close to the photomagnetic disc such that said magnetic head applies the magnetic field to the photomagnetic disc, and an unloading position where said head support is placed remote from the photomagnetic disc such that said magnetic head is prevented from applying the magnetic field to the photomagnetic disc, said moving means being engageable with said lifter;

means for retaining said head support at said loading position when said head support is moved to said loading position, and at said unloading position when said head support is moved to said unloading position, said retaining means being disposed on said carriage; and said retaining means including a groove disposed on said lifter and a coil spring having one end connected to said lifter and the other end connected to said carriage, said the other end being movable in said groove during movement of said lifter.

4. An apparatus for recording and reproducing information stored on a photomagnetic disc, comprising:

a carriage carrying an objective lens and radially movable with respect to the photomagnetic disc;

a head support disposed on said carriage, said head support holding a magnetic head which applies magnetic field to the photomagnetic disc, said head support including an arm supporting said magnetic head and a lifter rotatably supporting said arm;

means for moving said head support between a loading position where said head support is placed close to the photomagnetic disc such that said magnetic head applies the magnetic field to the photomagnetic disc, and an unloading position where said head support is placed remote from the photomagnetic disc such that said magnetic head is prevented from applying the magnetic field to the photomagnetic disc, said moving means being engageable with said lifter;

said moving means including a first rotating member rotatably driven by said motor, a second rotating member urged by said first rotating member to rotatably move to an engaging position where said second rotating member is engaged with said lifter, and an electromagnetic actuator allowing said second rotating member to be retained at said engaging position, said first rotating member is biased by a first spring in a direction reverse to a direction of rotation driven by said motor, and said second rotating member is biased by a second spring in a direction reverse to a direction of urging by said first rotating member, said second rotating member being formed with teeth which are engageable with said lifter to restrict the movement of said carriage;

means for retaining said head support at said loading position when said head support is moved to said loading position, and at said unloading position when said head support is moved to said unloading position, said retaining means being disposed on said carriage; and means for driving said moving means, said driving means including a transmission gear having a normal position and rotatable from said normal position in a first direction and a second direction reverse to said first direction, and including a motor driving said transmission gear, said driving means being actuated when said transmission gear rotates in said first direction.

5. An apparatus for recording and reproducing information stored on a photomagnetic disc, including a magnetic head which produces a magnetic field, comprising:

a carriage radially movable with respect to said photomagnetic disc;

means for supporting said magnetic head, said supporting means being movably disposed on said carriage with respect to said photomagnetic disc, said head support having a loading position where said magnetic head is disposed in contact with said photomagnetic disc to apply said magnetic field thereto and an unloading position where said magnetic head is disposed remote from said photomagnetic disc to be prevented from applying said magnetic field thereto;

means for locking said supporting means to prohibit the movement of said supporting means into said loading position, said locking means being shiftable between a locking position where said locking means engages said supporting means and a release position where said locking means disengages said supporting means;

said locking means including a base, a first pivotal member pivotally disposed on said base, and a second pivotal member pivotally disposed on said base, said second pivotal member being urged by said first pivotal member to be engaged with said supporting means, and two biasing means for respectively biasing said first and second pivotal members against said base in such a direction as to prevent the engagement of said second pivotal member with said supporting means;

means for driving said locking means between said locking position and said release position; and means for retaining said head supporting means at said loading and unloading positions, respectively, said retaining means being disposed on said carriage and said head supporting means.

6. An apparatus for recording and reproducing information stored on a photomagnetic disc, including a magnetic head which produces a magnetic field, comprising:

a carriage radially movable with respect to said photomagnetic disc;

means for supporting said magnetic head, said supporting means being movably disposed on said carriage with respect to said photomagnetic disc, said head support having a loading position where said magnetic head is disposed in contact with said photomagnetic disc to apply said magnetic field thereto and an unloading position where said magnetic head is disposed remote from said photomagnetic disc to be prevented from applying said magnetic field thereto;

means for locking said supporting means to prohibit the movement of said supporting means into said loading position, said locking means being shiftable between a locking position where said locking means engages said supporting means and a release position where said locking means disengages said supporting means;

means for driving said locking means between said locking position and said release position;

means for retaining said head supporting means at said loading and unloading positions, respectively, said retaining means being disposed on said carriage and said head supporting means; and said retaining means including a magnet disposed on said head support and two spaced members of magnetic material disposed on said carriage in opposed relation to said magnet so as to be attracted respectively by said magnet when said head support is placed at said loading and unloading positions.

7. An apparatus for recording and reproducing information stored on a photomagnetic disc, comprising:

a carriage carrying an objective lens and radially movable with respect to the photomagnetic disc;

a lifter rotatably supported by said carriage;

a head arm one end of which is disposed on said carriage and the other end of which holds a magnetic head which applies a magnetic field to the photomagnetic disc;

means for rotating said lifter between an unloading position where said lifter engages and lifts up said head arm such that said magnetic head is placed remote from the photomagnetic disc and is prevented from applying the magnetic field to the photomagnetic disc and a loading position where said lifter disengages from and does not lift up said head arm such that said magnetic head is placed close to the photomagnetic disc and is operative to apply the magnetic field to the photomagnetic disc; and means disposed on said carriage for retaining said lifter at said loading position or said unloading position.

8. An apparatus for recording and reproducing information stored on a photomagnetic disc, comprising:

a carriage carrying an objective lens and movable in a radial direction with respect to the photomagnetic disc;

a head arm one end of which is disposed on said carriage and the other end of which holds a magnetic head which is operative to apply a magnetic field to the photomagnetic disc;

means for moving said head arm between a loading position where said magnetic head is placed close to the photomagnetic disc such that the magnetic head applies the magnetic field to the photomagnetic disc and an unloading position where said magnetic head is lifted away from the photomagnetic disc while still overlapping and facing the photomagnetic disc, such that the magnetic head is spaced apart from the photomagnetic disc to prevent the application of the magnetic field to the photomagnetic disc; and means for driving said moving means, wherein said driving means includes a transmission gear having a normal position and being rotatable from said normal position in a first direction and a second direction reverse to said first direction, and a motor driving said transmission gear, said driving means being actuated when said transmission gear rotates in said first direction.

9. An apparatus for accessing information on or from an optical disc, comprising:

a carriage carrying an objective lens and radially movable with respect to the optical disc;

means for locking said carriage to prohibit movement of said carriage with respect to the optical disc;

ejecting means for ejecting said optical disc from the apparatus; and means for driving said locking means and said ejecting means, wherein said driving means includes a transmission gear having a normal position and being rotatable from said normal position in a first direction and a second direction reverse to said first direction, and a motor driving said transmission gear, said driving means actuating said locking means when said transmission gear rotates in said first direction and actuating said ejecting means when said transmission gear rotates in said second direction.

10. An apparatus as claimed in claim 8, wherein said moving means is disposed within a housing of the apparatus in spaced relation to said carriage.

11. An apparatus as claimed in claim 8, further comprising an ejecting mechanism for ejecting said photomagnetic disc from the apparatus, said ejecting mechanism being actuated when said transmission gear rotates in said second direction.

12. An apparatus as claimed in claim 8, further comprising means for locking said carriage to prohibit movement of said carriage with respect to the photomagnetic disc, said locking means being released when said transmission gear rotates in said first direction.

13. An apparatus as claimed in claim 8, further comprising:

a lifter rotatably supporting said arm wherein said moving means includes a first rotating member rotatably driven by said motor, a second rotating member urged by said first rotating member to rotatably move to an engaging position where said second rotating member is engaged with said lifter, and an electromagnetic actuator allowing said second rotating member to be retained at said engaging position.

14. An apparatus as claimed in claim 7, wherein said retaining means selectively retains said lifter at said loading position and said unloading position.

15. An apparatus as claimed in claim 14, wherein said retaining means retains said lifter at said loading position after said magnetic head is moved to said loading position.

16. An apparatus as claimed in claim 7, wherein said retaining means includes a biasing means for biasing said lifter against one of a pair of stops to engage said lifter therewith, said pair of stops disposed on said carriage, said biasing means having one end fixed to said lifter and the other end fixed to said carriage.

17. An apparatus as claimed in claim 7, wherein said retaining means includes a cam groove disposed on said lifter, a cam follower engaged with said cam groove and a biasing means for biasing said lifter against said carriage, said biasing means having one end connected to said lifter and the other end connected to said carriage.

18. An apparatus as claimed in claim 9, further comprising means for elevating said photomagnetic disc with respect to said magnetic head, said elevating means being associated with said locking means.

* * * * *